(12) United States Patent
Endo

(10) Patent No.: US 9,805,485 B2
(45) Date of Patent: Oct. 31, 2017

(54) ELECTRONIC DEVICE HAVING GRAPH DISPLAY FUNCTION IN WHICH USER CAN SET COEFFICIENT VARIATION RANGE FOR FINE COEFFICIENT VALUE ADJUSTMENT, AND GRAPH DISPLAY METHOD, AND STORAGE MEDIUM STORING GRAPH DISPLAY CONTROL PROCESS PROGRAM HAVING THE SAME

(71) Applicant: CASIO COMPUTER CO., LTD., Shibuya-ku, Tokyo (JP)

(72) Inventor: Kota Endo, Hachioji (JP)

(73) Assignee: CASIO COMPUTER CO., LTD., Tokyo (JP)

(*) Notice: Subject to any disclaimer, the term of this patent is extended or adjusted under 35 U.S.C. 154(b) by 314 days.

(21) Appl. No.: 14/582,129

(22) Filed: Dec. 23, 2014

(65) Prior Publication Data

US 2015/0187106 A1    Jul. 2, 2015

(30) Foreign Application Priority Data

Dec. 27, 2013  (JP) ................ 2013-272022

(51) Int. Cl.
*G06T 11/20*  (2006.01)

(52) U.S. Cl.
CPC ................ *G06T 11/206* (2013.01)

(58) Field of Classification Search
None
See application file for complete search history.

(56) References Cited

U.S. PATENT DOCUMENTS

| | | | |
|---|---|---|---|
| 3,789,203 | A | 1/1974 | Catherall et al. |
| 4,217,702 | A | 8/1980 | Bennett |
| 4,794,553 | A | 12/1988 | Watanabe et al. |

(Continued)

FOREIGN PATENT DOCUMENTS

| | | |
|---|---|---|
| CN | 101030119 A | 9/2007 |
| JP | 08179749 A | 7/1996 |

(Continued)

OTHER PUBLICATIONS

"Desmos", Desmos User Guide, http://s3.amazonaws.com/desmos/Desmos_Calculator_User_Guide.pdf, Feb. 2, 2013, 1-10.

(Continued)

*Primary Examiner* — Michael J Cobb
(74) *Attorney, Agent, or Firm* — Holtz, Holtz & Volek PC

(57) ABSTRACT

A graph display control apparatus displays a first operation display element for varying, within a preset range, a value of a coefficient included in a function expression; displays a graph image corresponding to the function expression based on the value of the coefficient which is varied in accordance with a user operation of the first operation display element; designates, in accordance with a user operation, a partial variation range of the set variation range of the value of the coefficient; displays a second operation display element for varying the value of the coefficient within the designated partial variation range of the value of the coefficient; and re-displays the graph image displayed based on the value of the coefficient which is varied in accordance with a user operation of the second operation display element.

18 Claims, 11 Drawing Sheets

(56) References Cited

U.S. PATENT DOCUMENTS

| | | | |
|---|---|---|---|
| 5,289,205 A | 2/1994 | Torres | |
| 5,303,338 A | 4/1994 | Handa et al. | |
| 5,510,995 A * | 4/1996 | Oliver | G05B 19/4099 |
| | | | 345/419 |
| 5,532,946 A | 7/1996 | Phipps et al. | |
| 5,539,427 A * | 7/1996 | Bricklin | G06F 17/30259 |
| | | | 345/173 |
| 5,539,867 A | 7/1996 | Handa et al. | |
| 5,739,823 A | 4/1998 | Akaza et al. | |
| 5,825,355 A | 10/1998 | Palmer et al. | |
| 5,999,193 A | 12/1999 | Conley et al. | |
| 6,133,924 A | 10/2000 | Ito et al. | |
| 6,208,343 B1 | 3/2001 | Roth | |
| 6,256,595 B1 | 7/2001 | Schwalb et al. | |
| 6,429,869 B1 | 8/2002 | Kamakura et al. | |
| 6,532,469 B1 | 3/2003 | Feldman et al. | |
| 6,549,923 B1 | 4/2003 | Sudoh | |
| 6,918,768 B2 | 7/2005 | Bardige et al. | |
| 6,922,816 B1 * | 7/2005 | Amin | G06F 3/04847 |
| | | | 715/732 |
| 7,289,120 B2 | 10/2007 | Fukaya | |
| 7,747,981 B2 | 6/2010 | Gray | |
| 8,089,482 B1 | 1/2012 | Axelrod | |
| 8,259,115 B2 | 9/2012 | Okano | |
| 8,407,580 B2 | 3/2013 | Gray et al. | |
| 8,413,116 B2 | 4/2013 | Gray | |
| 9,098,858 B2 | 8/2015 | Xia et al. | |
| 9,202,433 B2 | 12/2015 | Webb et al. | |
| 2003/0182333 A1 | 9/2003 | Good et al. | |
| 2004/0083247 A1 | 4/2004 | Koont | |
| 2004/0114258 A1 | 6/2004 | Harris, III et al. | |
| 2004/0227738 A1 | 11/2004 | Sudoh | |
| 2006/0204139 A1 | 9/2006 | Hayashi | |
| 2007/0046674 A1 | 3/2007 | Sudoh | |
| 2007/0073705 A1 | 3/2007 | Gray | |
| 2007/0153001 A1 | 7/2007 | Yu et al. | |
| 2007/0195093 A1 | 8/2007 | Springer et al. | |
| 2007/0198620 A1 | 8/2007 | Nilakantan et al. | |
| 2007/0298389 A1 | 12/2007 | Yu et al. | |
| 2008/0143746 A1 | 6/2008 | Irons | |
| 2008/0250347 A1 | 10/2008 | Gray et al. | |
| 2008/0256489 A1 | 10/2008 | Maurer et al. | |
| 2009/0063206 A1 * | 3/2009 | Payne | G06Q 30/0601 |
| | | | 705/5 |
| 2009/0102846 A1 | 4/2009 | Flockermann et al. | |
| 2009/0115782 A1 | 5/2009 | Irons et al. | |
| 2009/0164886 A1 | 6/2009 | Shah et al. | |
| 2009/0307587 A1 | 12/2009 | Kaneko | |
| 2010/0070931 A1 * | 3/2010 | Nichols | G06F 3/0488 |
| | | | 715/863 |
| 2010/0156830 A1 * | 6/2010 | Homma | G06F 3/04847 |
| | | | 345/173 |
| 2010/0231596 A1 | 9/2010 | Matsuda | |
| 2011/0004864 A1 | 1/2011 | Gray | |
| 2011/0043517 A1 | 2/2011 | Schneider et al. | |
| 2011/0227946 A1 | 9/2011 | Yoshizawa et al. | |
| 2011/0254862 A1 | 10/2011 | Okano | |
| 2012/0030626 A1 | 2/2012 | Hopkins et al. | |
| 2012/0050328 A1 | 3/2012 | Karoji | |
| 2012/0159370 A1 | 6/2012 | Rode et al. | |
| 2012/0306879 A1 * | 12/2012 | Yokoyama | G06F 3/0488 |
| | | | 345/428 |
| 2013/0050064 A1 | 2/2013 | Okano | |
| 2013/0097551 A1 * | 4/2013 | Hogan | G06F 3/04847 |
| | | | 715/780 |
| 2013/0235069 A1 * | 9/2013 | Ubillos | G09G 5/026 |
| | | | 345/594 |
| 2013/0268263 A1 | 10/2013 | Park et al. | |
| 2014/0096056 A1 | 4/2014 | Latzina | |
| 2014/0253542 A1 | 9/2014 | Jung et al. | |
| 2014/0282252 A1 * | 9/2014 | Edwards | G06F 3/04847 |
| | | | 715/833 |
| 2014/0317570 A1 | 10/2014 | Endo | |
| 2014/0365947 A1 | 12/2014 | Karoji | |
| 2015/0170372 A1 | 6/2015 | Rubins et al. | |
| 2015/0187105 A1 | 7/2015 | Endo et al. | |
| 2015/0268845 A1 | 9/2015 | Endo | |
| 2015/0310646 A1 * | 10/2015 | Karoji | G06T 11/206 |
| | | | 345/440 |
| 2016/0041944 A1 | 2/2016 | Karoji | |
| 2016/0077725 A1 | 3/2016 | Maeda | |

FOREIGN PATENT DOCUMENTS

| | | | |
|---|---|---|---|
| JP | 09050273 A | | 2/1997 |
| JP | 09185586 A | | 7/1997 |
| JP | 09282475 A | | 10/1997 |
| JP | 11328279 A | | 11/1999 |
| JP | 2001350731 A | * | 12/2001 |
| JP | 2004199260 A | | 7/2004 |
| JP | 2004206541 A | | 7/2004 |
| JP | 2004326691 A | | 11/2004 |
| JP | 2005107862 A | | 4/2005 |
| JP | 2005107908 A | * | 4/2005 |
| JP | 2005107987 A | * | 4/2005 |
| JP | 2005182125 A | | 7/2005 |
| JP | 2011181050 A | | 9/2011 |
| JP | 2011185911 A | | 9/2011 |
| JP | 2012014440 A | | 1/2012 |
| JP | 2012203605 A | | 10/2012 |
| JP | 2013045147 A | * | 3/2013 |
| JP | 2013050746 A | | 3/2013 |
| WO | 2004029791 A2 | | 4/2004 |

OTHER PUBLICATIONS

Page, "Quadratic curve and graph display (standard form)", Math Open Reference, Jan. 1, 2009.
"Fluid Math-2, Fluid Graphing Calculator for iPad", Sep. 20, 2012, https://www.youtube.com/watch?v=Nz8WP-NVXJc.
"Fluid Math-3, SmartBoard Math Software for Algebra Teachers", Feb. 25, 2012, https://www.youtube.com/watch?v=LRqOBK03g2E.
"FluidMath-1 Introduction—Tablet and Interactive Whiteboard Math Software", Mar. 2, 2011, https://www.youtube.com/watch?v=BAFGONn4KoQ.
"sketch2Graph iPad App (Tutorial)", Nov. 30, 2012, https://www.youtube.com/watch?v=0ss1MPU-TBE.
Graphing the Derivative as appearing on Nov. 15, 2013, available as http://web.archive.org/web/20131115154629/http://www.zweigmedia.com/RealWorld/calctopic/derivgraph.html.
German Office Action (and English translation thereof) dated Jan. 28, 2016, issued in German Application No. 102015206965.6.
Invitation to Oral Hearing dated Jul. 18, 2016 issued in counterpart German Application No. 10 2015 206 965.6.
Hohenwarter, et al., "Introduction to Geogebra Version 4.4", International Geogebra Institute, 2013. Web. May 25, 2017.
Japanese Office Action dated Aug. 1, 2017 issued in counterpart Japanese Application No. 2013-271793.

\* cited by examiner

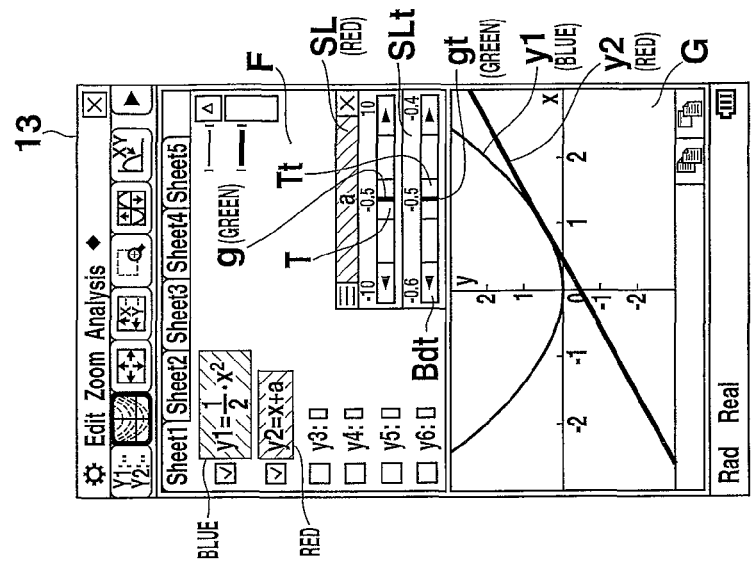
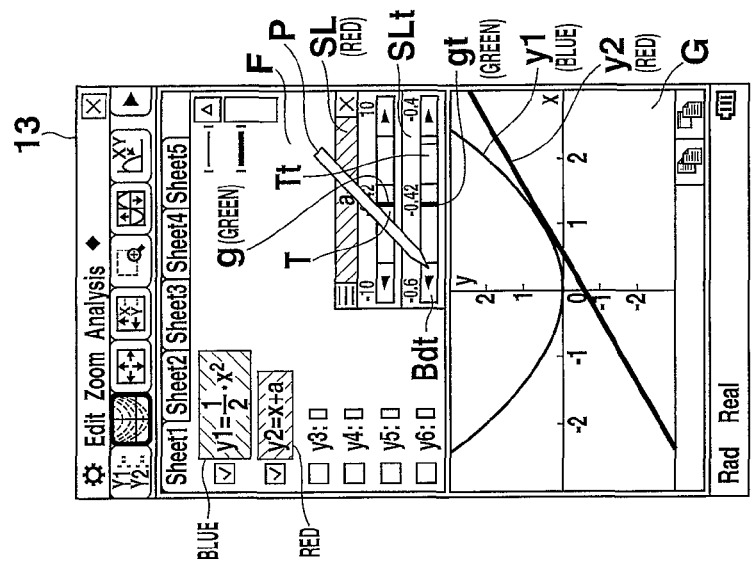
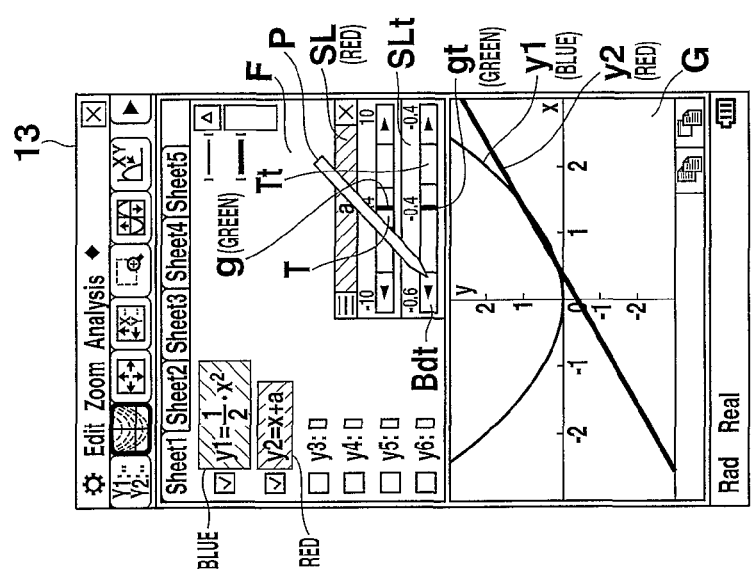

ELECTRONIC DEVICE HAVING GRAPH DISPLAY FUNCTION IN WHICH USER CAN SET COEFFICIENT VARIATION RANGE FOR FINE COEFFICIENT VALUE ADJUSTMENT, AND GRAPH DISPLAY METHOD, AND STORAGE MEDIUM STORING GRAPH DISPLAY CONTROL PROCESS PROGRAM HAVING THE SAME

CROSS-REFERENCE TO RELATED APPLICATIONS

This application is based upon and claims the benefit of priority from prior Japanese Patent Application No. 2013-272022, filed Dec. 27, 2013, the entire contents of which are incorporated herein by reference.

BACKGROUND OF THE INVENTION

1. Field of the Invention

The present invention relates to a graph display control apparatus for displaying a graph image corresponding to a function expression, an electronic device, and a graph display method.

2. Description of the Related Art

Conventionally, in a scientific electronic calculator (graph scientific electronic calculator) having a graph display function, if an arbitrary function expression, $y=f(x)$, is input, a graph image corresponding to this input function expression is displayed on a display unit.

Here, there is such a case that, as regards the above-mentioned graph image, it is desired to view a variation of the graph image by varying a coefficient value of a term of the function expression. In such a case, such a graph scientific electronic calculator has been thought that, in a state in which a quadratic function expression, $y=AX^2+X+1$, for instance, is input, a dedicated screen for setting a numerical value of a coefficient A of this function expression is displayed, and an initial value (Start), a final value (End) and a variation interval (Pitch) of the coefficient A are input and set on this dedicated screen. Thereby, graph images corresponding to the respective function expressions corresponding to the variation of the numeral value of the coefficient A are displayed as dynamic graphs on the display unit (see, for example, Jpn. Pat. Appin. KOKAI Publication No. H09-282475).

In addition, recently, such a graph scientific electronic calculator has been thought that a slider, which varies the numerical value of the coefficient A in a range between a set minimum value and a set maximum value, is displayed, and the tab of the slider is moved, thereby displaying a graph image corresponding to a function expression of a coefficient value which corresponds to the movement position of this tab.

In the above-described conventional graph scientific electronic calculator, when the characteristics of a desired function expression including a coefficient and the characteristic point thereof are to be analyzed, it is necessary to set the coefficient value of this function expression at a specific numerical value, and to display the corresponding graph image.

However, in such a graph scientific electronic calculator that the coefficient value can be varied only within a predetermined variation interval between the set initial value and final value of the coefficient value, it is difficult to precisely make the coefficient value agree with the above-mentioned specific numerical value.

In addition, also in a graph scientific electronic calculator in which the above-described coefficient value is varied by moving the tab of the slider, in order to precisely make the coefficient value agree with the specific numerical value, the numerical value variation amount corresponding to a movement unit (e.g. one display dot) of the tab has to be finely set. In this case, such a problem arises that the coefficient value cannot largely be varied.

The present invention has been made in consideration of the above problems, and the object of the invention is to provide a graph display control apparatus, an electronic device and a control program thereof, wherein when the numerical value of a coefficient included in a function expression is varied in accordance with a user operation and a graph image corresponding to this function expression is displayed, the numerical value of the coefficient can be quickly and easily varied to a specific numerical value, and a graph image corresponding to a function expression including this coefficient can be displayed.

BRIEF SUMMARY OF THE INVENTION

In general, according to one embodiment, a graph display control apparatus includes a function expression display control unit configured to display a function expression including a coefficient on a display unit; a coefficient value variation range setting unit configured to set a variation range for varying, within a preset range, a value of the coefficient included in the function expression displayed by the function expression display control unit; a coefficient value first varying unit configured (i) to display on the display unit a first operation display element for varying the value of the coefficient within the variation range of the value of the coefficient, which is set by the coefficient value variation range setting unit, and (ii) to vary the value of the coefficient in accordance with a user operation of the first operation display element; a graph display control unit configured to display on the display unit a graph image corresponding to the function expression displayed by the function expression display control unit, based on the value of the coefficient which is varied by the coefficient value first varying unit; a variation range part designation unit configured to designate, in accordance with a user operation, a partial variation range of the variation range of the value of the coefficient, which is set by the coefficient value variation range setting unit; a coefficient value second varying unit configured (i) to display on the display unit a second operation display element for varying the value of the coefficient within the partial variation range of the value of the coefficient, which is designated by the variation range part designation unit, and (ii) to vary a current value of the coefficient in accordance with a user operation of the second operation display element; and a graph re-display control unit configured to re-display the graph image displayed by the graph display control unit, based on the value of the coefficient varied by the coefficient value second varying unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7A, FIG. 7B and FIG. 7C are views illustrating the display operation (part 2) corresponding to the user operation according to the first embodiment, which is involved in the graph rendering process of the graph scientific electronic calculator 10.

DETAILED DESCRIPTION OF THE INVENTION

Embodiments of the present invention will be described hereinafter with reference to the accompanying drawings.

Figure 1:
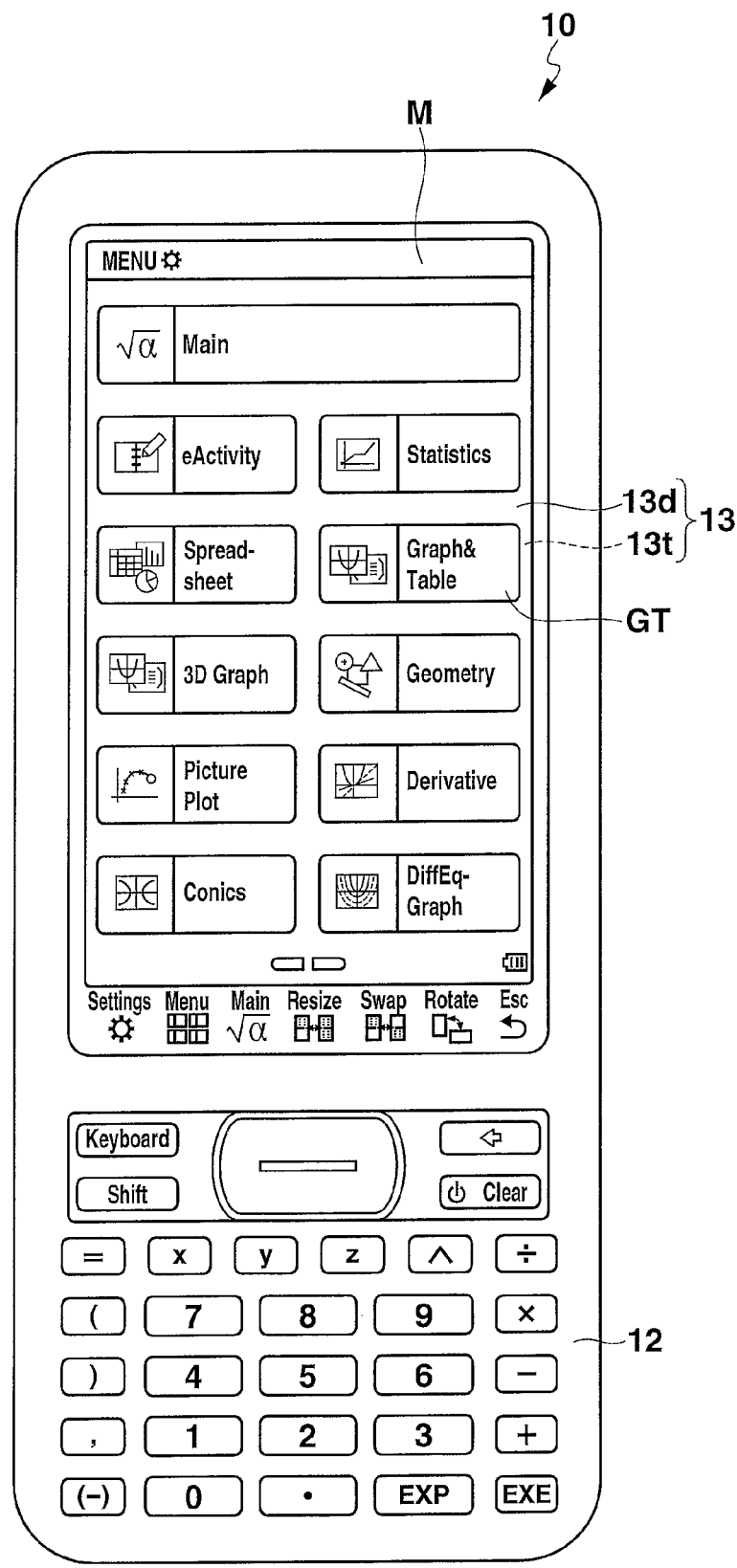
FIG. 1 is a front view illustrating an external appearance structure of a graph scientific electronic calculator 10 according to an embodiment of a graph display control apparatus of the present invention.

FIG. 1 is a front view illustrating an external appearance structure of a graph scientific electronic calculator 10 according to an embodiment of a graph display control apparatus of the present invention.

This graph display control apparatus is constructed as a purpose-specific graph scientific electronic calculator 10 which is to be described below, or is constructed as a tablet terminal, a mobile phone, a portable game console, or the like, which includes a graph display function corresponding to a function expression.

This graph scientific electronic calculator 10 includes a function of displaying an input function expression and a graph image corresponding to this function expression.

On the main body of this graph scientific electronic calculator 10, a key input unit 12 is provided in a range of approximately a lower half of a front surface of the main body, and a touch panel display unit 13 is provided in a range of approximately an upper half of the front surface.

The key input unit 12 is equipped with numeral value/sign keys, function/operator keys, and a cursor key.

The numeral/sign keys are composed of an input key group of numerical values/signs, in which individual keys of numerals and signs are arranged.

The function/operator keys are composed of various function sign keys which are operated at a time of inputting an arithmetic expression or a function expression, and operator keys such as [+], [−], [×], [÷], and [=].

In addition, the touch panel display unit 13 is configured such that a transparent touch panel 13t is laid over a liquid crystal display screen 13d which is capable of effecting color display.

In this graph scientific electronic calculator 10, a main menu M, as illustrated in FIG. 1, is displayed in accordance with a touch operation of a menu button [Menu] which is displayed along a lower end of the touch panel display unit 13. By selectively touch-operating various icons displayed on this main menu M, a transition occurs to an operation mode of a function corresponding to the touched icon.

In this embodiment, a description is given of an operation mode (graph mode) of a graph function which is started by a [Graph & Table] icon GT.

Figure 2:
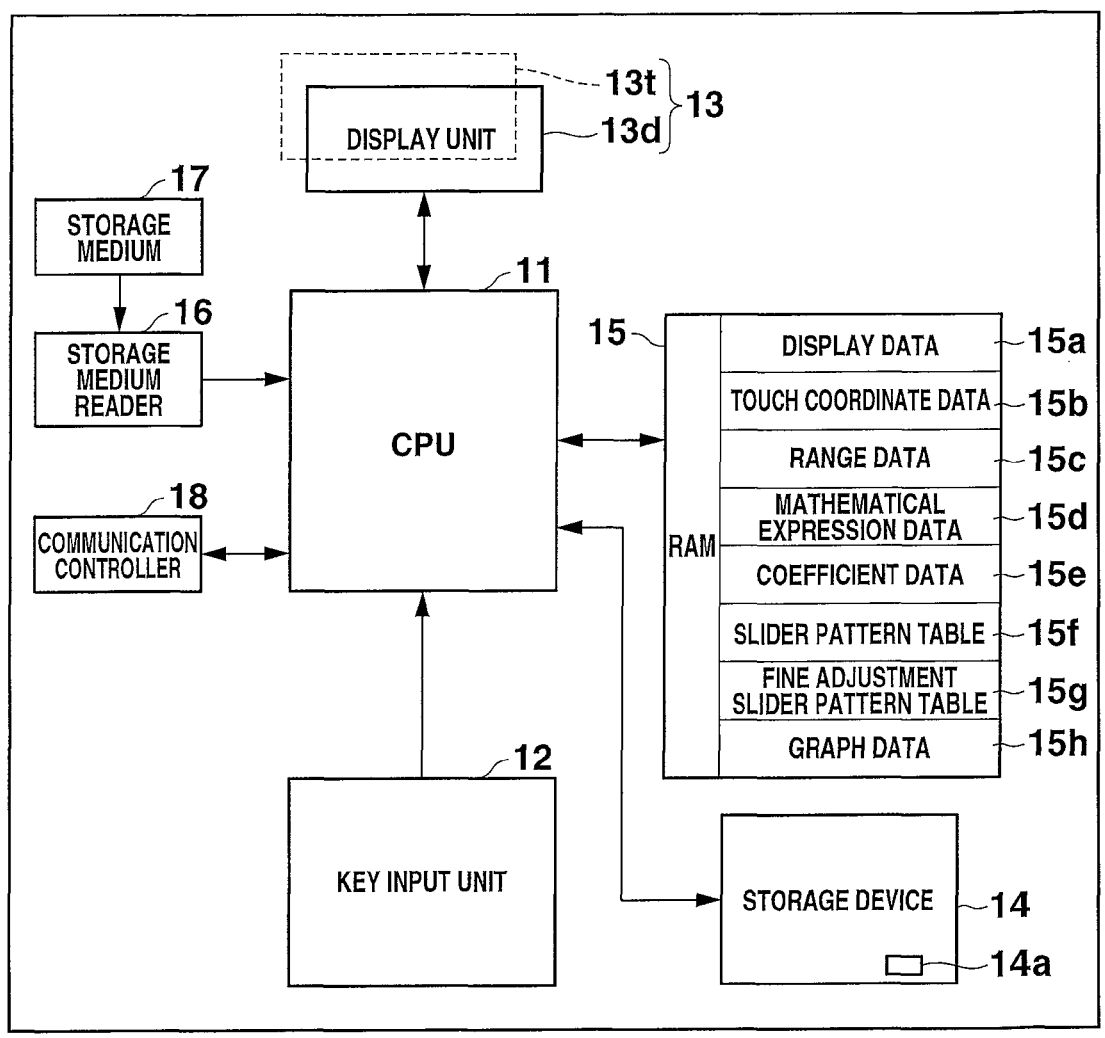
FIG. 2 is a block diagram illustrating a circuit configuration of the graph scientific electronic calculator 10.

FIG. 2 is a block diagram illustrating a circuit configuration of the graph scientific electronic calculator 10.

The graph scientific electronic calculator 10 includes a CPU 11 which is a microcomputer.

In accordance with an electronic calculator control program 14a prestored in a storage device 14 such as a flash ROM, or an electronic calculator control program 14a which has been read in the storage device 14 from an external storage medium 17 such as a memory card via a storage medium reader 16, or an electronic calculator control program 14a which has been downloaded in the storage device 14 via a communication controller 18 from a Web server (program server) on a communication network (Internet), the CPU 11 controls the operations of the respective circuit components by using a RAM 15 as a working memory, and executes various functions provided in the graph scientific electronic calculator 10, such as an electronic calculator function, and a function graph rendering function.

The storage device 14, RAM 15, storage medium reader 16 and communication controller 18, in addition to the key input unit 12 and touch panel display unit 13 shown in FIG. 1, are connected to the CPU 11.

The RAM 15 stores various data which are necessary for the processing operations of the CPU 11. The RAM 15 is provided with a display data storage area 15a on which data that is color-displayed on the screen of the touch panel display unit 13 is developed, and is also provided with a touch coordinate data storage area 15b, a range data storage area 15c, a mathematical expression data storage area 15d, a coefficient data storage area 15e, a slider pattern table 15f, a fine adjustment slider pattern table 15g, and a graph data storage area 15h.

In the touch coordinate data storage area 15b, coordinate data of a touch position corresponding to a user operation, which has been detected by the touch panel display unit 13, is stored.

In the range data storage area 15c, an X coordinate range (Xmin~Xmax) and a Y coordinate range (Ymin~Ymax), which indicate a display range of a graph image that is set on a graph image area (see FIG. 6A to FIG. 11B) of the touch panel display unit 13 in the graph mode, are stored.

In the mathematical expression data storage area 15d, data relating to function expressions, y=f(x), which have been input by an operation of the key input unit 12, are stored together with data of display colors on a graph expression area F (see FIG. 6A to FIG. 11B), which are individually set for a plurality of function expressions y1, y2, . . . . In this embodiment, five kinds of display colors are set. Namely, the display color of the function expression y1 is "blue", the display color of y2 is "red", the display color of y3 is "green", the display color of y4 is "pink", and the display color of y5 is "black". For function expressions y6 onwards, these five kinds of display colors are repeatedly set.

In the coefficient data storage area 15e, data relating to a coefficient in each term included in the function expression, y=f(x), stored in the mathematical expression data storage area 15d, is stored together with a sign (e.g. a, b, c, . . . ) of the coefficient, and data of a numerical value set for the coefficient.

In the slider pattern table 15f, data relating to the patterns of coefficient sliders SL, . . . (see FIG. 6A to FIG. 11B), which are operation display elements for designating the numerical value of each coefficient a, . . . , stored in the coefficient data storage area 15e, are stored together with data relating to the display color of each coefficient slider SL, variable minimum value (Min), variable maximum value (Max), current value (Current) and variation amount (Step). In this case, the display color of each coefficient slider SL is set to be identical to the display color of the function expression yn in which the corresponding coefficient is included, and the variable minimum value (Min) thereof is initially set at "−10", the variable maximum value (Max) is initially set at "10", the current value (Current) is initially set at "1", and the variation amount (Step) is initially set at "1".

In the meantime, the variation amount (Step) of the coefficient value stored in the slider pattern table 15f is the variation amount of a decrease or an increase corresponding to a one-time touch operation on a left button [←] Bd or a right button [→] Bu of the coefficient slider SL. Aside from this, a variation amount (Dot) corresponding to a movement width of one display dot in a movable range W (minimum value (Min)~maximum value (Max)) of a tab T of the coefficient slider SL is also stored (see FIG. 6A). Specifically, when the number of display dots corresponding to the movable range W of the tab T of the coefficient slider SL is 100 display dots, the variation amount (Dot) of the coefficient value corresponding to the movement width of one display dot of the tab T becomes "0.2" that is obtained by dividing a numerical value variable range "20", which comprises the initially set variable minimum value (Min) "−10" to the variable maximum value (Max) "10", by 100 display dots.

In this case, the variation amount (Step) corresponding to a one-time touch operation on the left button [←] Bd or right button [→] Bu of the coefficient slider SL is defined as "step unit", and the variation amount (Dot) corresponding to the movement width of one display dot in the movable range of the tab T of the coefficient slider SL is defined as "dot unit".

In the fine adjustment slider pattern table 15g, data relating to the pattern of a fine adjustment slider SLt (see FIG. 7A to FIG. 11B), which is an operation display element for more finely designating the coefficient value designated by the coefficient slider SL, within a numerical value variable range comprising a minimum value and a maximum value of a fine range that is obtained in accordance with a user operation within the numerical value variable range of the coefficient slider SL stored in the slider pattern table 15f, is stored together with data relating to the display color thereof, variable minimum value (Min), variable maximum value (Max), current value (Current) and variation amount (Step). In this case, the display color of the fine adjustment slider SLt is set to be identical to the display color of the coefficient slider SL in which the fine adjustment range is included.

In the graph data storage area 15h, data relating to graphs, which are generated based on the function expressions, y=f(x), stored in the mathematical expression data storage area 15d, and the numerical values of coefficients of the terms included in the function expressions, y=f(x), are stored as data indicative of rendering positions of graph images corresponding to the plural function expressions y1, y2, . . . , and as data indicative of display colors of the graph images y1, y2, . . . . In this case, the display color of each graph image y1, y2, . . . , is set to be identical to the display color of the corresponding function expression yn.

Specifically, the display color of the function expression yn, which is stored in the mathematical expression data storage area 15d, the display colors of the coefficient slider SL and fine adjustment slider SLt for varying the numerical value of the coefficient included in this function expression yn, which are stored in the slider pattern table 15f and fine adjustment slider pattern table 15g, and the display color of the graph image yn corresponding to the function expression yn including the coefficient value varied by the coefficient slider SL and fine adjustment slider SLt, which is stored in the graph data storage area 15h, are identical.

The graph scientific electronic calculator 10 with the above-described structure controls the operations of the respective circuit components in accordance with various processing instructions described in the above-described electronic calculator control program 14a, and the hardware and the software cooperate to realize various functions which will be described in the operational description below.

Next, the operation of the graph scientific electronic calculator 10 with the above-described structure is described.

Figure 3:
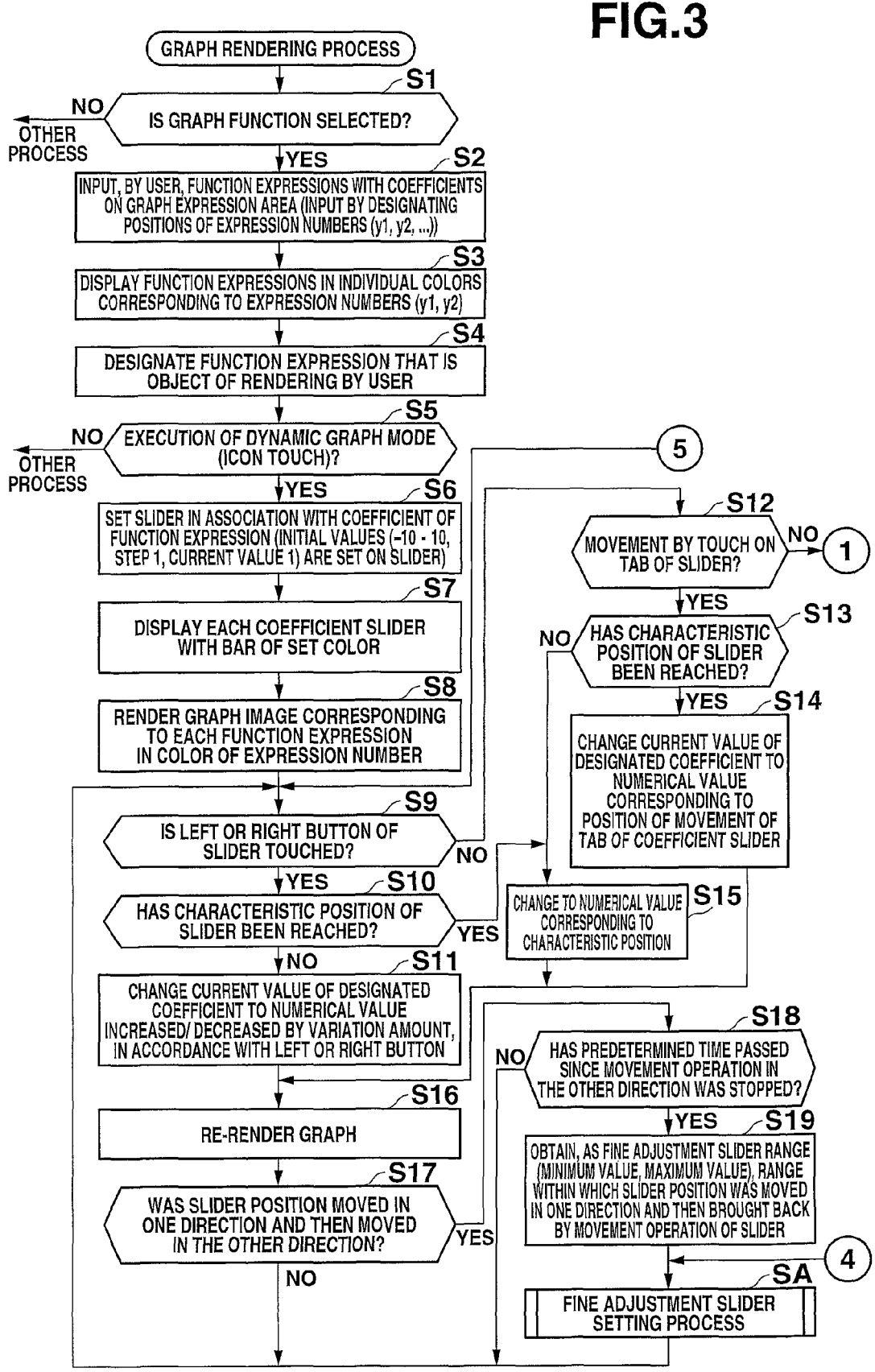
FIG. 3 is a flowchart illustrating a graph rendering process (part 1) of the graph scientific electronic calculator 10.

FIG. 3 is a flowchart illustrating a graph rendering process (part 1) of the graph scientific electronic calculator 10.

Figure 4:
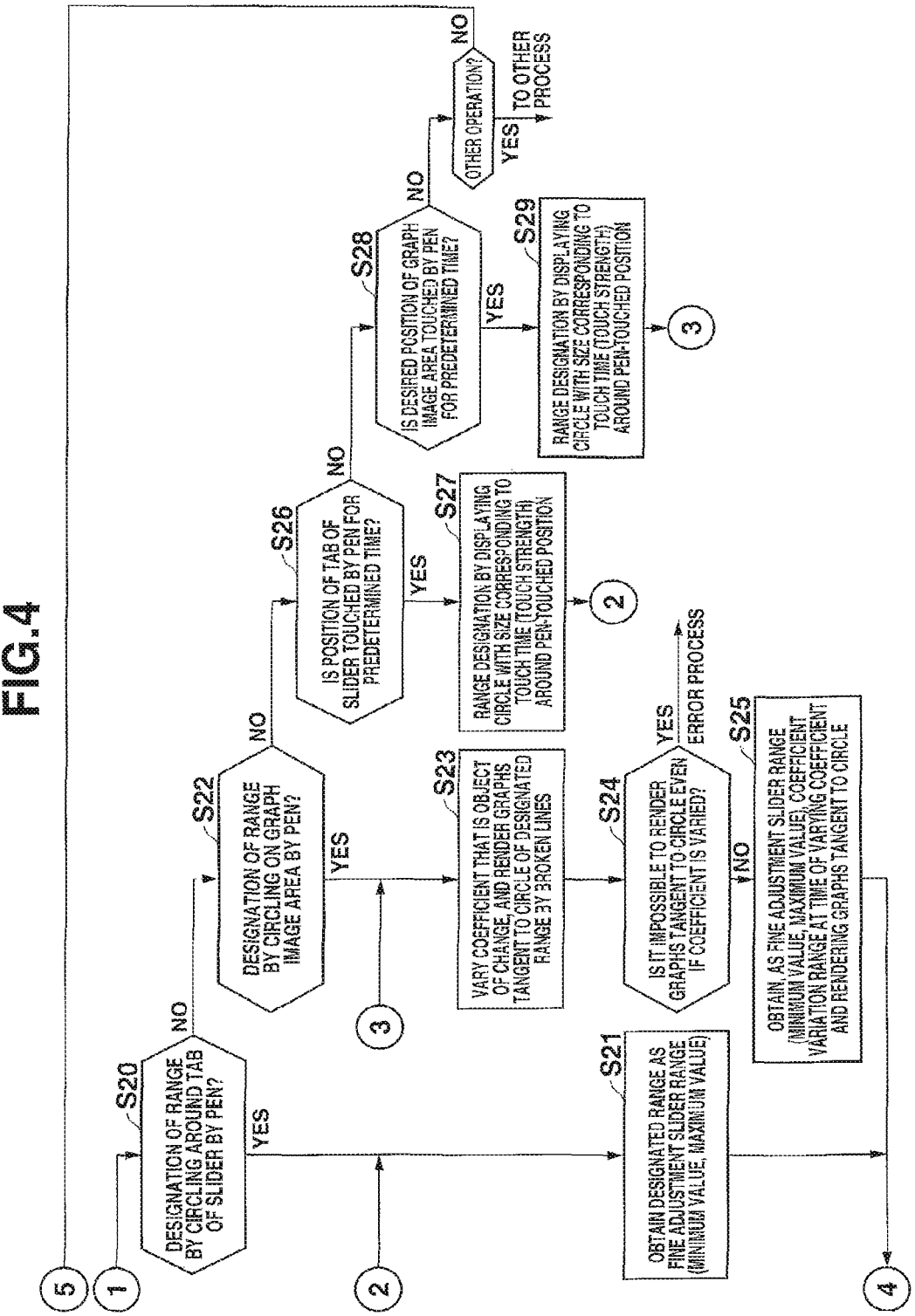
FIG. 4 is a flowchart illustrating a graph rendering process (part 2) of the graph scientific electronic calculator 10.

FIG. 4 is a flowchart illustrating a graph rendering process (part 2) of the graph scientific electronic calculator 10.

Figure 5:
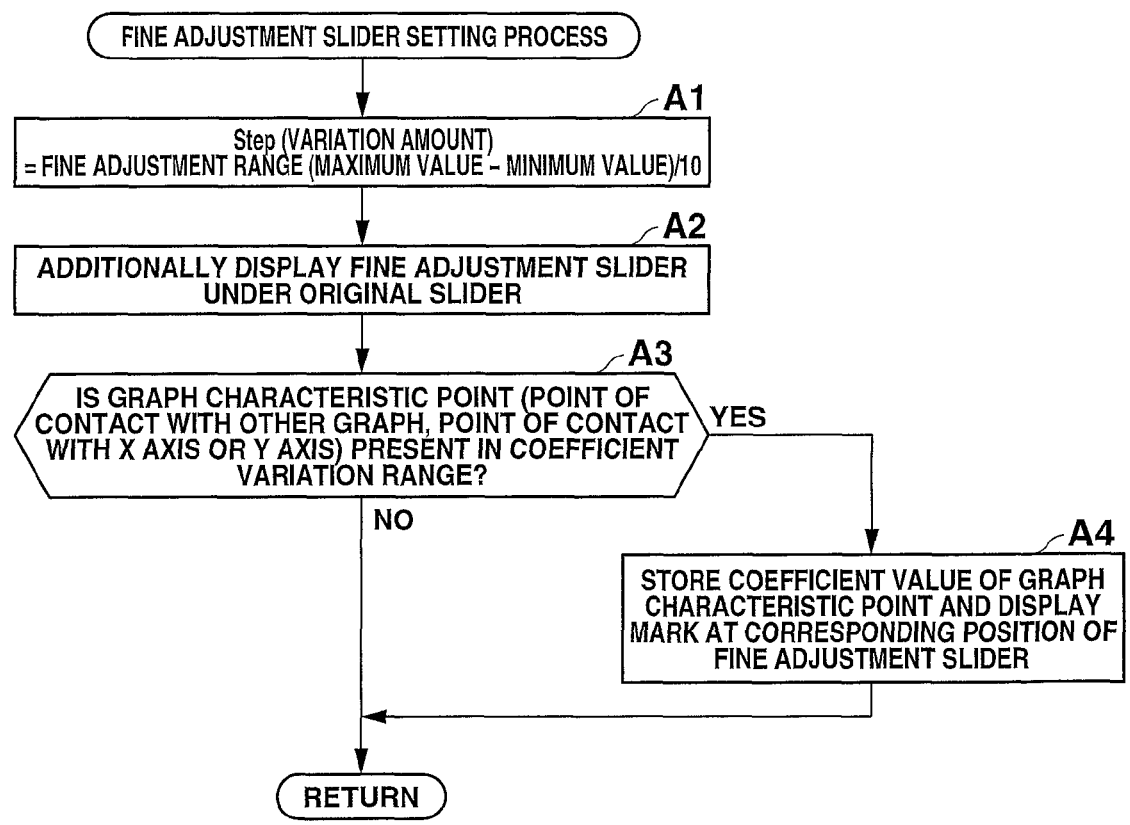
FIG. 5 is a flow chart illustrating a fine adjustment slider setting process which is involved in the graph rendering process of the graph scientific electronic calculator 10.

FIG. 5 is a flow chart illustrating a fine adjustment slider setting process which is involved in the graph rendering process of the graph scientific electronic calculator 10.

Figure 6C:
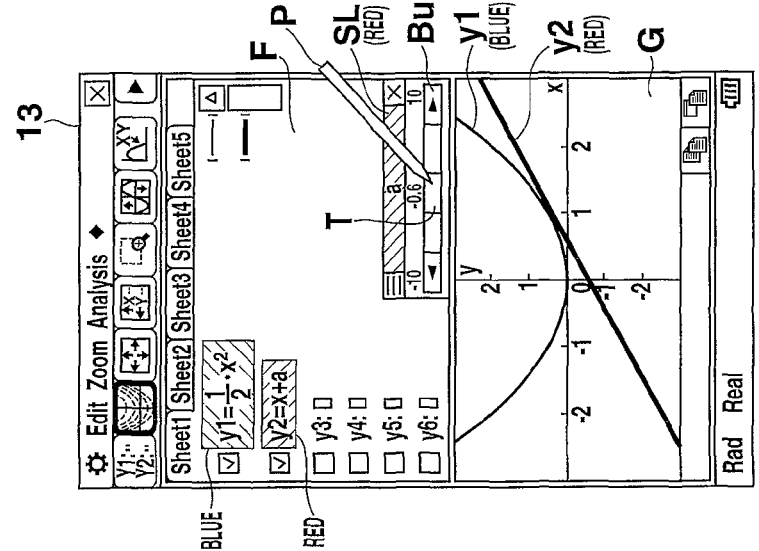
FIG. 6A, FIG. 6B and FIG. 6C are views illustrating a display operation (part 1) corresponding to a user operation according to a first embodiment, which is involved in the graph rendering process of the graph scientific electronic calculator 10.
Figure 6B:
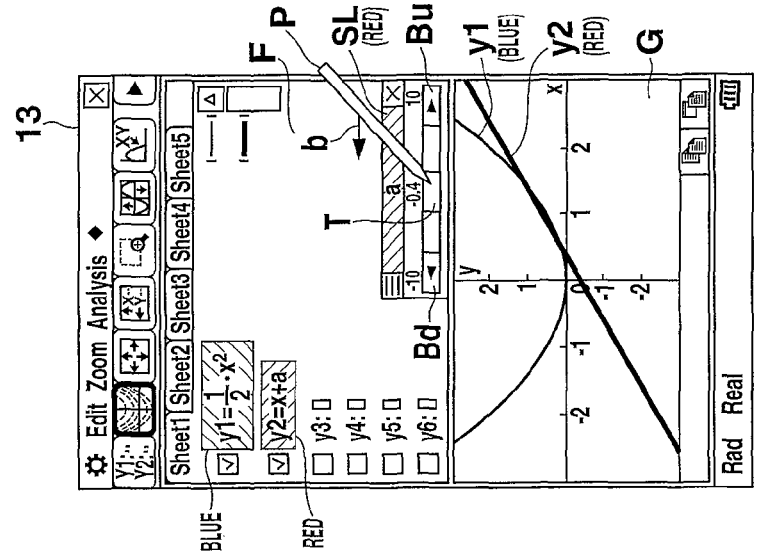
Figure 6A:
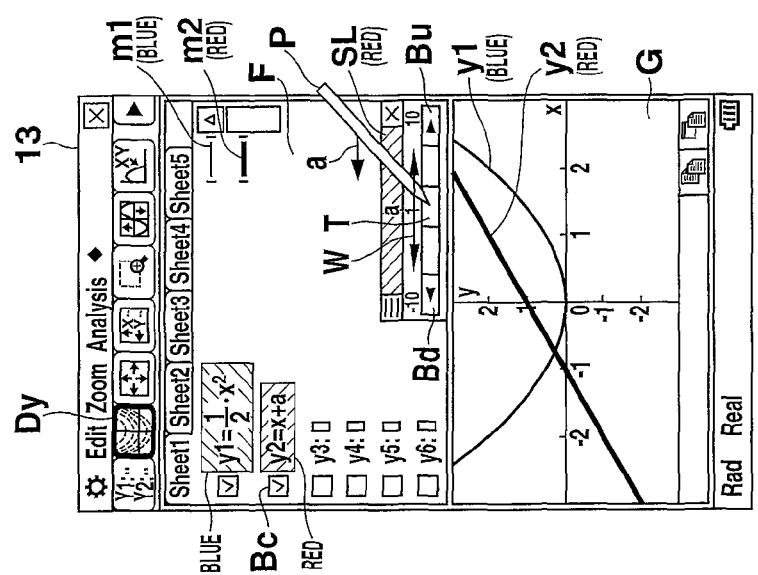

FIG. 6A, FIG. 6B and FIG. 6C are views illustrating a display operation (part 1) corresponding to a user operation according to a first embodiment, which is involved in the graph rendering process of the graph scientific electronic calculator 10.

FIG. 7A, FIG. 7B and FIG. 7C are views illustrating the display operation (part 2) corresponding to the user operation according to the first embodiment, which is involved in the graph rendering process of the graph scientific electronic calculator 10.

As illustrated in FIG. 1, if the [Graph & Table] icon GT is touch-operated and selected on the main menu M which is displayed on the touch panel display unit 13 in accordance with a touch operation of the menu button [Menu], the graph mode is started and, as illustrated in FIG. 6A, a graph expression area F and a graph image area G are displayed on the upper-half area and lower-half area of the touch panel display unit 13, respectively (step S1 (Yes)).

In the graph expression area F, if the position of an expression number yn is designated by a touch operation and a function expression with a coefficient is input in accordance with an operation of the key input unit 12 (step S2), the input function expression is stored in the mathematical expression data storage area 15$d$ and is displayed in a display color which is individually set in advance in accordance with the designated expression number yn (step S3).

In the present embodiment, a function expression, $y1=(1/2) \cdot x^2$, which has been input, is displayed in blue, and a function expression, $y2=x+a$, is displayed in red, and also rendering color marks m1 and m2, which indicate the rendering colors of line segments of graph images corresponding to the respective function expressions y1 and y2, are displayed in the same colors as the display colors of the respective function expressions.

In this manner, in the graph expression area F in which the arbitrary function expressions y1 and y2 have been input, check boxes Bc, which are located at the beginning of the function expressions, are touched and designated, and check marks are added to the function expressions y1 and y2 which are objects of rendering of graph images (step S4).

As regards the function expressions y1 and y2 to which the check marks have been added, in order to analyze a characteristic point at which a graph image corresponding to one of the function expressions, namely the linear function expression y2, becomes a tangent to a graph image y1 corresponding to the other quadratic function expression y1, by varying the graph image corresponding to this linear function expression y2 while varying a coefficient "a" of the liner function expression y2, if an execution icon Dy of a dynamic graph mode is touch-operated as illustrated in FIG. 6A (step S5 (Yes)), a slider pattern of the coefficient slider SL, which is associated with the coefficient "a" of the linear function expression y2, is set and stored in the slider pattern table 15$f$ (step S6).

Specifically, as initial values for varying the coefficient "a", the minimum value (Min) is set at "−10", the maximum value (Max) is set at "10", the variation amount (Step) is set at "1", and the current value (Current) is initially set at "1", and the display color of the coefficient slider SL is set to be red which is the same color as the display color of the designated function expression y2, and the respective setting data are stored in the slider pattern table 15$f$.

Then, in the graph expression area F, the coefficient slider SL, to which a bar of the set display color (red) is added, is displayed (step S7).

In this case, the coefficient slider SL includes a left button [←] Bd and a right button [→] Bu for variable setting with a value corresponding to the set coefficient values (minimum value "−10", maximum value "10", current value "1", variation amount "1"), and a tab T which is indicative of a current value within a bar-shaped movable range W extending between the left and right buttons Bd and Bu. If the position of the tab T is moved in a left-and-right direction, a numerical value in units of a dot, which corresponds to the position of the moved tab T, is displayed as the current value of the coefficient in a coefficient value area on the movable range W.

Then, the data of the graph image y1 corresponding to the quadratic function expression, $y1=(1/2) \cdot x^2$, and the data of the graph image y2 corresponding to the linear function expression, $y2=x+a$, in which the numerical value of the coefficient "a" is set at the above set current value "1", are rendered in the graph data storage area 15$h$ in accordance with the XY coordinate range stored in the range data storage area 15$c$. In addition, the graph image y1 is displayed on the graph image area G in blue that is the same display color as the function expression, $y1=(1/2) \cdot x^2$, and also the graph image y2 is displayed on the graph image area G in red that is the same display color as the function expression, $y2=x+a$, and the coefficient slider SL thereof (step S8).

In this case, as indicated by arrows a and b in FIGS. 6A and 6B, if the tab T of the coefficient slider SL is touched by a pen P and moved to the left direction by an amount corresponding to 7 display dots (step S12 (Yes)) and the current value "1" of the coefficient "a" is changed to "−0.4" (step S14), the graph image y2 of the function expression, $y2=x+a$, in which the coefficient "a" has been changed to "−0.4", is re-rendered (step S16).

On the other hand, if the left button [←] Bd or right button [→] Bu of the coefficient slider SL is pen-touched (step S9 (Yes)), the current value "1" of the coefficient "a" is varied and increased/decreased by the step unit (step S11), and the graph image y2 corresponding to the function expression, $y2=x+a$, of the changed coefficient "a" is re-rendered (step S16).

As illustrated in FIG. 6A and FIG. 6B, while the tab T of the coefficient slider SL is moved to the left and the current value of the coefficient "a" is decreased in units of the variation amount "0.2" that is the dot unit, the graph image y2 corresponding to the function expression y2 is moved in parallel in the minus direction (step S12, S14, S16). In this state, as illustrated in FIG. 6B and FIG. 6C, if the current value of the coefficient "a" has decreased to "−0.6" and the graph image y2 corresponding to the function expression y2 has moved past a position at which the graph image y2 exactly becomes a tangent to the graph image y1 corresponding to the function expression y1, the tab T of the coefficient slider SL is reversely moved in the right direction, and the current value is brought back to "−0.4", as illustrated in FIG. 6B.

Then, it is determined that the position of the tab T of the coefficient slider SL was moved in one direction and then moved in the other direction (step S17 (Yes)).

In this case, if it is determined that a predetermined time has passed since the movement operation of the tab T in the other direction was stopped (step S18 (Yes)), the range ("−0.4"~"−0.6"), within which the tab T of the coefficient slider SL was moved in one direction and then brought back in association with the coefficient value that was increased/decreased by the coefficient slider SL, is obtained as a numerical value variable range (minimum value "−0.6", maximum value "−0.4") of a fine adjustment slider SLt (step S19).

Then, a transition occurs to a fine adjustment slider setting process in FIG. 5 (step SA)

In this fine adjustment slider setting process, based on the numerical value variable range (minimum value "−0.6", maximum value "−0.4") of the fine adjustment slider SLt which was obtained in accordance with a user operation of the coefficient slider SL, a step-unit variation amount (Step: 0.02) thereof is calculated (step A1).

Then, the setting data of the fine adjustment slider SLt, in which the minimum value (Min) is set at "−0.6", the maximum value (Max) is set at "−0.4", the variation amount (Step) is set at "0.02" and the current value (Current) is set at "−0.4", is generated and stored in the fine adjustment slider pattern table 15$g$. In addition, as illustrated in FIG. 7A, the fine adjustment slider SLt is additionally displayed such that the fine adjustment slider SLt is juxtaposed under the above-described original coefficient slider SL (step A2).

It is then determined whether there is a graph characteristic point (e.g. a point of contact with another graph image, a point of contact with a coordinate axis) in a numerical value variation range of the fine adjustment slider SLt (step A3).

If it is determined that a numerical value (−0.5) corresponding to a graph characteristic point (in this case, a point at which the graph image y2 becomes a tangent to the graph image y1) is included in the numerical value variation range (−0.6~−0.4) of the fine adjustment slider SLt (step A3 (Yes)), the numerical value "−0.5" of the coefficient "a", which corresponds to this characteristic point (tangent), is stored in the fine adjustment slider pattern table 15g. Then, as illustrated in FIG. 7A, characteristic position marks g and gt, which indicate the position of the numerical value "−0.5" corresponding to the characteristic point (tangent), are distinguishably displayed in green on the coefficient slider SL and fine adjustment slider SLt (step A4).

Thus, if a left button [←] Bd is pen-touched once on the fine adjustment slider SLt shown in FIG. 7A (step S9 (Yes)), the current value of the coefficient "a" is changed to "−0.42", to which the current value is decreased in accordance with the variation amount (Step) "0.02", as illustrated in FIG. 7B, and it is determined that the current value has not reached the characteristic position mark gt (step S10, S11).

Then, the graph image y2 of the function expression, y2=x+a, in which the coefficient "a" has been changed to "−0.42", is re-rendered (step S16).

Further, like the above, by the repeated pen touch of the left button [←] Bd of the fine adjustment slider SLt (step S9 (Yes)), if it is determined that the current value of the coefficient "a" has been decreased in units of the variation amount (Step) "0.02" and has reached "−0.5", that is, that the current value of the coefficient "a" has reached the characteristic position mark gt (step S10 (Yes)), the current value of the coefficient "a" is changed to the numerical value "−0.5" corresponding to the characteristic position mark gt (step S15).

Then, the graph image y2 of the function expression, y2=x+a, in which the coefficient "a" has been changed to "−0.5", is re-rendered as an exact tangent to the graph image y1 corresponding to the function expression, $y1=(1/2) \cdot x^2$ (step S16).

Thereby, when the graph image y2 corresponding to the linear function expression y2 is varied by a user operation of the coefficient slider SL and the position, at which the graph image y2 becomes a tangent to the graph image y1 corresponding to the quadratic function expression y1, is analyzed, if the linear graph image y2, which is varied, has moved past the position, at which the linear graph image y2 becomes the tangent to the quadratic graph image y1, and has varied in the neighborhood of this position, the fine adjustment slider SLt having the numerical value variable range of the coefficient "a" between the minimum value "−0.6" and the maximum value "−0.4", which corresponds to the range of the neighborhood of this position, is displayed. By the user operation of this fine adjustment slider SLt, the linear graph image y2 can easily and exactly be varied to the position, at which the linear graph image y2 becomes the tangent to the quadratic graph image y1, and can be displayed.

Furthermore, on the fine adjustment slider SLt, in accordance with the numeral value change of the coefficient "a", the characteristic position mark gt is displayed at the characteristic point at which the linear graph image y2 becomes the tangent to the quadratic graph image y1. When this numeral value change has reached or exceeded the characteristic point corresponding to this characteristic position mark gt, the current value of the coefficient "a" is changed to the numerical value of this characteristic point and the linear graph image y2 is re-displayed. Thus, the linear graph image y2 can more exactly and easily be varied to agree with the position at which the linear graph image y2 becomes the tangent to the quadratic graph image y1.

Figure 8A:
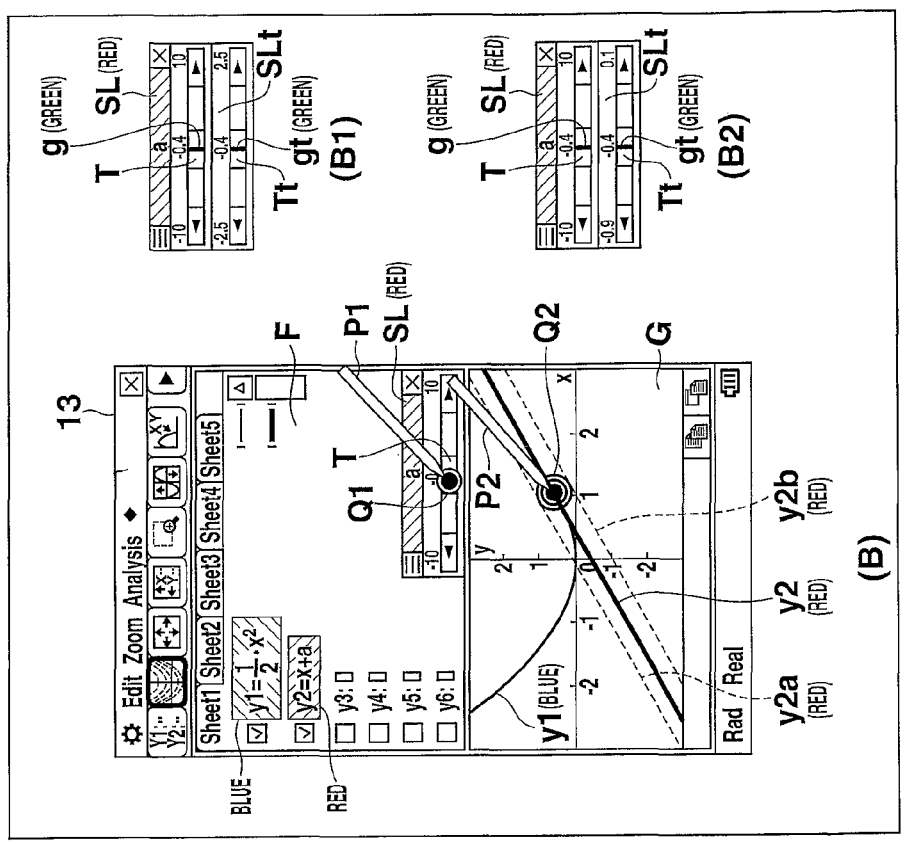
FIG. 8A and FIG. 8B are views illustrating a display operation corresponding to a user operation according to a second embodiment, which is involved in the graph rendering process of the graph scientific electronic calculator 10.
Figure 8B:
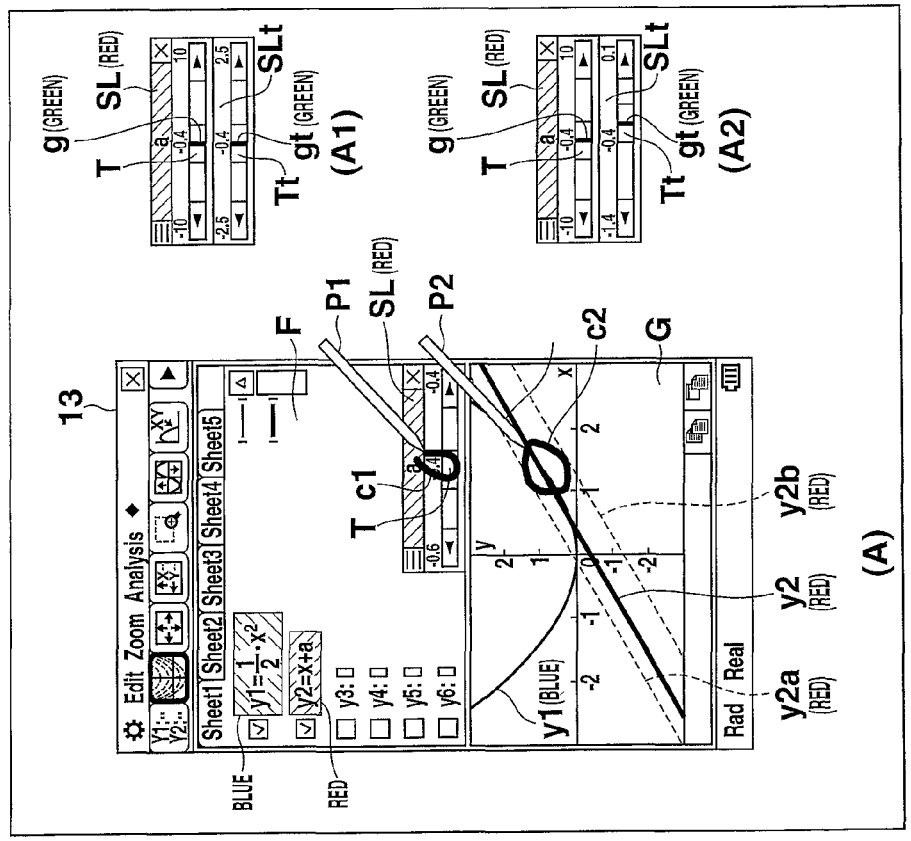

FIG. 8A and FIG. 8B are views illustrating a display operation corresponding to a user operation according to a second embodiment, which is involved in the graph rendering process of the graph scientific electronic calculator 10.

Like the above-described FIG. 6B, as illustrated in FIG. 8A, if it is determined that a circling operation c1 has been performed by a pen touch P1 around a position of the tab T of the coefficient slider SL in the state in which the coefficient slider SL of the coefficient "a" included in the function expression y2 is operated by a user operation and the current value of the coefficient "a" is changed to "−0.4" (step S20 (Yes)), a numerical value variable range ("−2.5"~"2.5" in this case), which has been designated by the circling operation c1, is obtained as a numerical value variable range (minimum value "−2.5", maximum value "2.5") of the fine adjustment slider SLt (step S21).

Then, a transition occurs to the fine adjustment slider setting process in FIG. 5 (step SA). Based on the numerical value variable range (minimum value "−2.5", maximum value "2.5") of the fine adjustment slider SLt which has been obtained in accordance with the circling operation c1 of the coefficient slider SL, a step-unit variation amount (Step: 0.5) thereof is calculated (step A1).

Then, the setting data of the fine adjustment slider SLt, in which the minimum value (Min) is set at "−2.5", the maximum value (Max) is set at "2.5", the variation amount (Step) is set at "0.5" and the current value (Current) is set at "−0.4", is generated and stored in the fine adjustment slider pattern table 15g. In addition, as illustrated in FIG. 8A (A1), the fine adjustment slider SLt is additionally displayed such that the fine adjustment slider SLt is juxtaposed under the above-described original coefficient slider SL (step A2).

In this case, if it is determined that a numerical value (−0.5) corresponding to a graph characteristic point (in this case, a point at which the graph image y2 becomes a tangent to the graph image y1) is included in the numerical value variation range (−2.5~2.5) of the fine adjustment slider SLt (step A3 (Yes)), the numerical value "−0.5" of the coefficient "a", which corresponds to this characteristic point (tangent), is stored in the fine adjustment slider pattern table 15g. Then, as illustrated in FIG. 8A (A1), characteristic position marks g and gt, which indicate the position of the numerical value "−0.5" corresponding to the characteristic point (tangent), are distinguishably displayed in green on the coefficient slider SL and fine adjustment slider SLt (step A4).

Thereby, like the above, when the numerical value of the coefficient "a" does not agree with the position corresponding to the above-described characteristic point by the user operation of the coefficient slider SL, the circling operation c1 may be performed around the tab T of the coefficient slider SL, and thereby the fine adjustment slider SLt of the numerical value variable range corresponding to this circling operation c1 can be generated and displayed. Thus, by the user operation, the linear graph image y2 can easily and exactly be varied to the position, at which the linear graph image y2 becomes the tangent to the quadratic graph image y1, and can be displayed.

In addition, like the above-described FIG. 6B, as illustrated in FIG. 8A, if it is determined that a circling operation c2 has been performed by a pen touch P2 around a position at which the graph image y2 may likely become the tangent to the graph image y1, in the state in which the current value of the coefficient "a" of the linear function expression y2 is set at "−0.4" and the graph image y2 is not exactly the tangent to the quadratic graph image y1 (step S22 (Yes)), the current value "−0.4" of the coefficient "a" is varied and increased/decreased, and graph images y2a and y2b, which are tangent to the designated range of the circling operation c2, are rendered by broken lines in the graph data storage area 15h and are displayed on the graph image area G (step S23).

Then, a variation range ("−1.4"~"0.1" in this case) of the coefficient "a", which is involved in the rendering of the graph images y2a and y2b of broken lines that are tangent to the designated range of the circling operation c2, is obtained as a numerical value variable range (minimum value "−1.4", maximum value "0.1") of the fine adjustment slider SLt (step S25).

In the meantime, in the case where graph images which are tangent to the designated range of the circling operation c2 on the graph image area G cannot be rendered even if the current value of the coefficient "a" is varied and increased/decreased (step S24 (Yes)), this case is processed as an error.

In the above-described step S25, if the numerical value variable range (minimum value "−1.4", maximum value "0.1") of the fine adjustment slider SLt is obtained, a transition occurs to the fine adjustment slider setting process in FIG. 5 (step SA). Based on the obtained numerical value variable range (minimum value "−1.4", maximum value "0.1"), a step-unit variation amount (Step: 0.15) thereof is calculated (step A1).

Then, the setting data of the fine adjustment slider SLt, in which the minimum value (Min) is set at "−1.4", the maximum value (Max) is set at "0.1", the variation amount (Step) is set at "0.15" and the current value (Current) is set at "−0.4", is generated and stored in the fine adjustment slider pattern table 15g. In addition, as illustrated in FIG. 8A (A2), the fine adjustment slider SLt is additionally displayed such that the fine adjustment slider SLt is juxtaposed under the above-described original coefficient slider SL (step A2).

In this case, if it is determined that a numerical value (−0.5) corresponding to a graph characteristic point (in this case, a point at which the graph image y2 becomes a tangent to the graph image y1) is included in the numerical value variation range (−1.4~0.1) of the fine adjustment slider SLt (step A3 (Yes)), the numerical value "−0.5" of the coefficient "a", which corresponds to this characteristic point (tangent), is stored in the fine adjustment slider pattern table 15g. Then, as illustrated in FIG. 8A (A2), characteristic position marks g and gt, which indicate the position of the numerical value "−0.5" corresponding to the characteristic point (tangent), are distinguishably displayed in green on the coefficient slider SL and fine adjustment slider SLt (step A4).

Thereby, like the above, when the numerical value of the coefficient "a" does not agree with the position corresponding to the above-described characteristic point by the user operation of the coefficient slider SL, the circling operation c2 may be performed around the neighborhood of the characteristic point of the graph image y2 relative to the graph image y1 displayed on the graph image area G. Also by this, the fine adjustment slider SLt of the numerical value variable range, which corresponds to the variation range of the graph images y2a and y2b corresponding to the circling operation c2, can be generated and displayed. Thus, by the user operation, the linear graph image y2 can easily and exactly be varied to the position, at which the linear graph image y2 becomes the tangent to the quadratic graph image y1, and can be displayed.

In addition, like the above-described FIG. 6B, as illustrated in FIG. 8B, if it is determined that a pen touch P1 has been performed for a predetermined time at a certain position of the tab T of the coefficient slider SL in the state in which the coefficient slider SL of the coefficient "a" included in the function expression y2 is operated by a user operation and the current value of the coefficient "a" is changed to "−0.4" (step S26 (Yes)), a circle Q1 of a size, which corresponds to the touch time (or touch strength (pressure)), is displayed around the position of the pen touch P1 (step S27).

Then, a numerical value variable range ("−2.5"~"2.5" in this case) at the position circled by the circle Q1, which corresponds to the pen touch P1, is obtained as a numerical value variable range (minimum value "−2.5", maximum value "2.5") of the fine adjustment slider SLt (step S21).

Then, a transition occurs to the fine adjustment slider setting process in FIG. 5 (step SA). Based on the numerical value variable range (minimum value "−2.5", maximum value "2.5") of the fine adjustment slider SLt which is obtained by the pen touch P1 on the coefficient slider SL, a step-unit variation amount (Step: 0.5) thereof is calculated (step A1).

Then, the setting data of the fine adjustment slider SLt, in which the minimum value (Min) is set at "−2.5", the maximum value (Max) is set at "2.5", the variation amount (Step) is set at "0.5" and the current value (Current) is set at "−0.4", is generated and stored in the fine adjustment slider pattern table 15g. In addition, as illustrated in FIG. 8B (B1), the fine adjustment slider SLt is additionally displayed such that the fine adjustment slider SLt is juxtaposed under the above-described original coefficient slider SL (step A2).

In this case, too, like the above, if it is determined that a numerical value (−0.5) corresponding to a graph characteristic point (in this case, a point at which the graph image y2 becomes a tangent to the graph image y1) is included in the numerical value variation range (−2.5~2.5) of the fine adjustment slider SLt (step A3 (Yes)), characteristic position marks g and gt, which indicate the position of the numerical value "−0.5" of the coefficient "a" corresponding to the characteristic point (tangent), are distinguishably displayed in green (step A4).

Thereby, like the above, when the numerical value of the coefficient "a" does not agree with the position corresponding to the above-described characteristic point by the user operation of the coefficient slider SL, the circle Q1 may be displayed by the pen touch P1 for a predetermined time or more at the position of the tab T of the coefficient slider SL. Also by this, the fine adjustment slider SLt of the numerical value variable range corresponding to this circle Q1 can be generated and displayed. Thus, by the user operation, the linear graph image y2 can easily and exactly be varied to the position, at which the linear graph image y2 becomes the tangent to the quadratic graph image y1, and can be displayed.

In addition, like the above-described FIG. 6B, as illustrated in FIG. 8B, if a pen touch P2 is performed for a predetermined time or more at a position at which the graph image y2 may likely become the tangent to the graph image y1, in the state in which the current value of the coefficient "a" of the linear function expression y2 is set at "−0.4" and the graph image y2 is not exactly the tangent to the quadratic graph image y1 (step S28 (Yes)), a circle Q2 of a size, which corresponds to the touch time (or touch strength (pressure)), is displayed around the position of the pen touch P2 (step S29).

Then, the current value "−0.4" of the coefficient "a" is varied and increased/decreased, and graph images y2a and y2b, which are tangent to the circle Q2 that is displayed in accordance with the pen touch P2, are rendered by broken lines and are displayed on the graph image area G (step S23).

Then, a variation range ("−0.9"~"0.1" in this case) of the coefficient "a", which is involved in the rendering of the graph images y2a and y2b of broken lines that are tangent to the circle Q2, is obtained as a numerical value variable range (minimum value "−0.9", maximum value "0.1") of the fine adjustment slider SLt (step S25).

Then, a transition occurs to the fine adjustment slider setting process in FIG. 5 (step SA). Based on the obtained numerical value variable range (minimum value "−0.9", maximum value "0.1"), a step-unit variation amount (Step: 0.1) thereof is calculated (step A1).

Then, the setting data of the fine adjustment slider SLt, in which the minimum value (Min) is set at "−0.9", the maximum value (Max) is set at "0.1", the variation amount (Step) is set at "0.1" and the current value (Current) is set at "−0.4", is generated and stored in the fine adjustment slider pattern table 15g. In addition, as illustrated in FIG. 8B (B2), the fine adjustment slider SLt is additionally displayed such that the fine adjustment slider SLt is juxtaposed under the above-described original coefficient slider SL (step A2).

In this case, too, like the above, if it is determined that a numerical value (−0.5) corresponding to the graph characteristic point is included in the numerical value variation range (−0.9~0.1) of the fine adjustment slider SLt (step A3 (Yes)), characteristic position marks g and gt, which indicate the position of the numerical value "−0.5" of the coefficient "a" corresponding to the characteristic point (tangent), are distinguishably displayed in green (step A4).

Thereby, like the above, when the numerical value of the coefficient "a" does not agree with the position corresponding to the above-described characteristic point by the user operation of the coefficient slider SL, the pen touch P2 may be performed in the vicinity of the characteristic point of the graph image y2 relative to the graph image y1 displayed on the graph image area G, and the circle Q2 of the size corresponding to this pen touch P2 may be displayed. Also by this, the fine adjustment slider SLt of the numerical value variable range, which corresponds to the variation range of the graph images y2a and y2b corresponding to the circle Q2, can be generated and displayed. Thus, by the user operation, the linear graph image y2 can easily and exactly be varied to the position, at which the linear graph image y2 becomes the tangent to the quadratic graph image y1, and can be displayed.

Figure 9A:
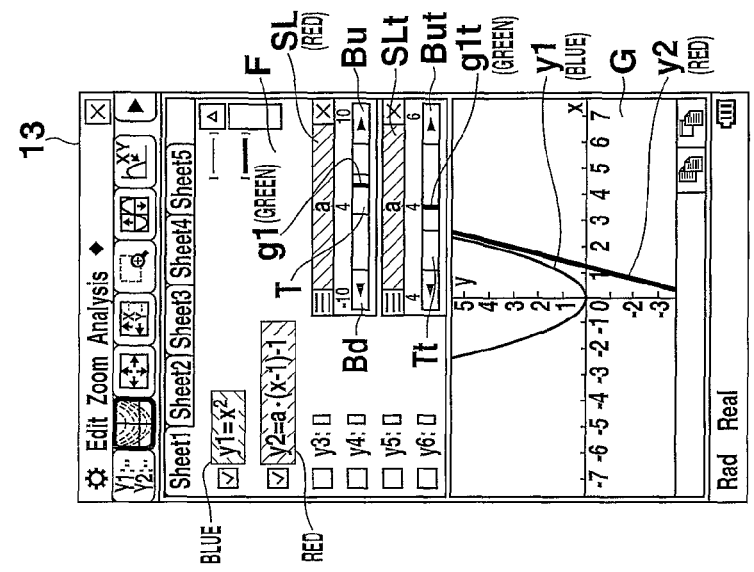
FIG. 9A, FIG. 9B and FIG. 9C are views illustrating a display operation (part 1) corresponding to a user operation according to a third embodiment, which is involved in the graph rendering process of the graph scientific electronic calculator 10.
Figure 9B:
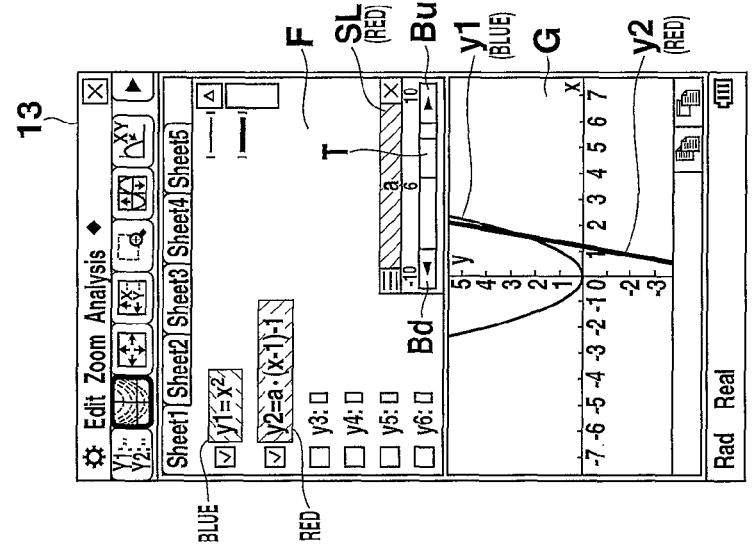
Figure 9C:
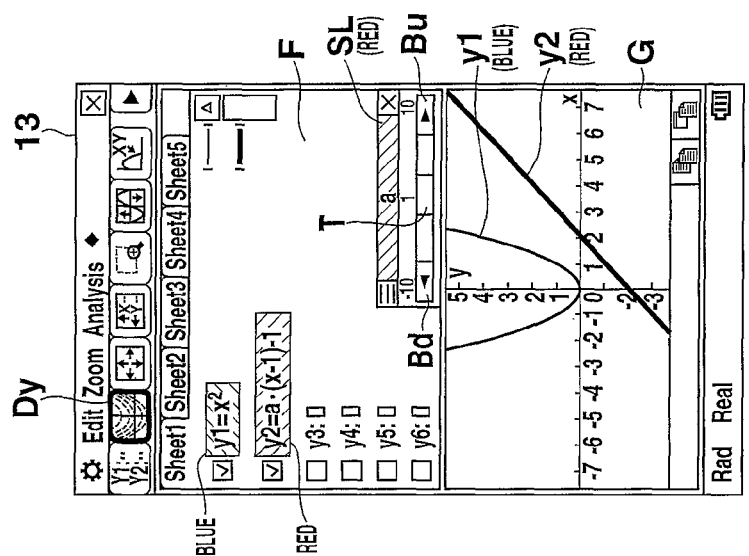

FIG. 9A, FIG. 9B and FIG. 9C are views illustrating a display operation (part 1) corresponding to a user operation according to a third embodiment, which is involved in the graph rendering process of the graph scientific electronic calculator 10.

Figure 10B:
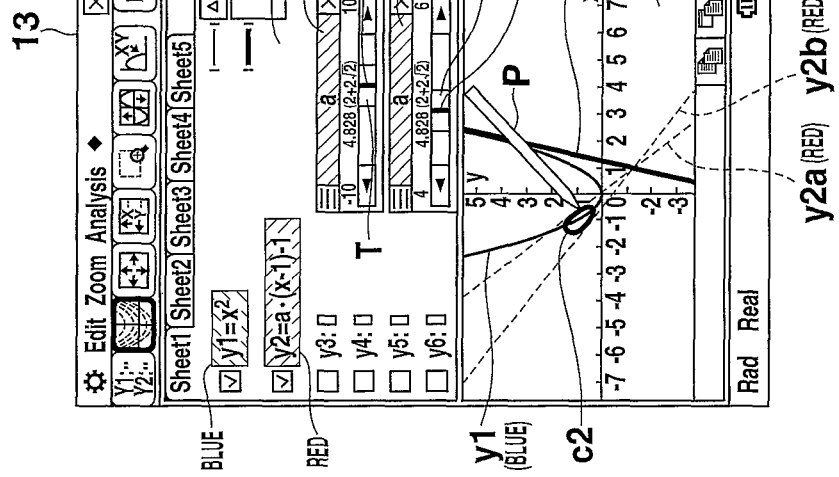
FIG. 10A and FIG. 10B are views illustrating the display operation (part 2) corresponding to the user operation according to the third embodiment, which is involved in the graph rendering process of the graph scientific electronic calculator 10.
Figure 10A:
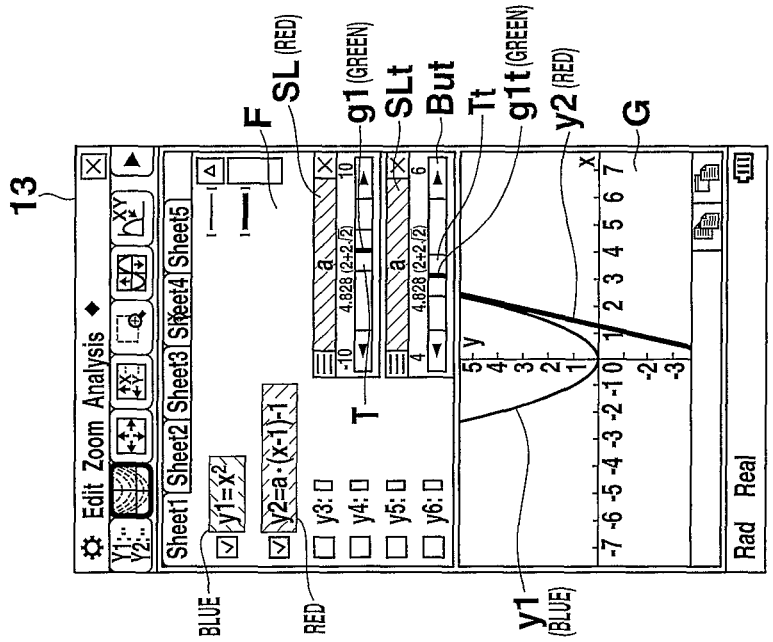

FIG. 10A and FIG. 10B are views illustrating the display operation (part 2) corresponding to the user operation according to the third embodiment, which is involved in the graph rendering process of the graph scientific electronic calculator 10.

Figure 11B:
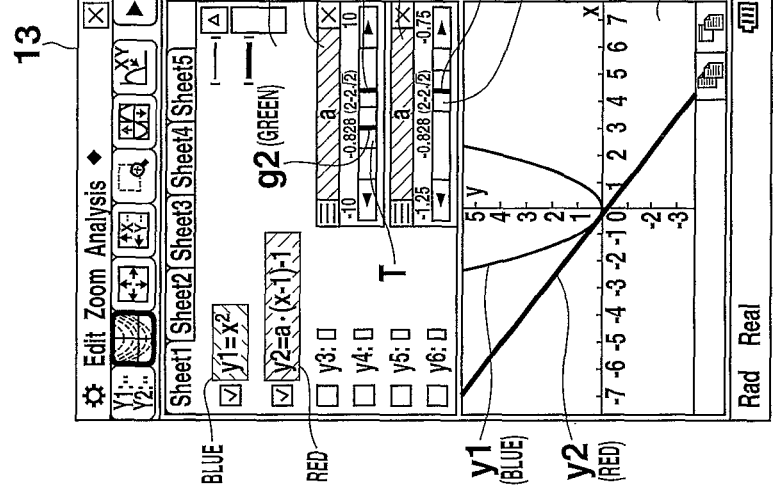
FIG. 11A and FIG. 11B are views illustrating the display operation (part 3) corresponding to the user operation according to the third embodiment, which is involved in the graph rendering process of the graph scientific electronic calculator 10.
Figure 11A:
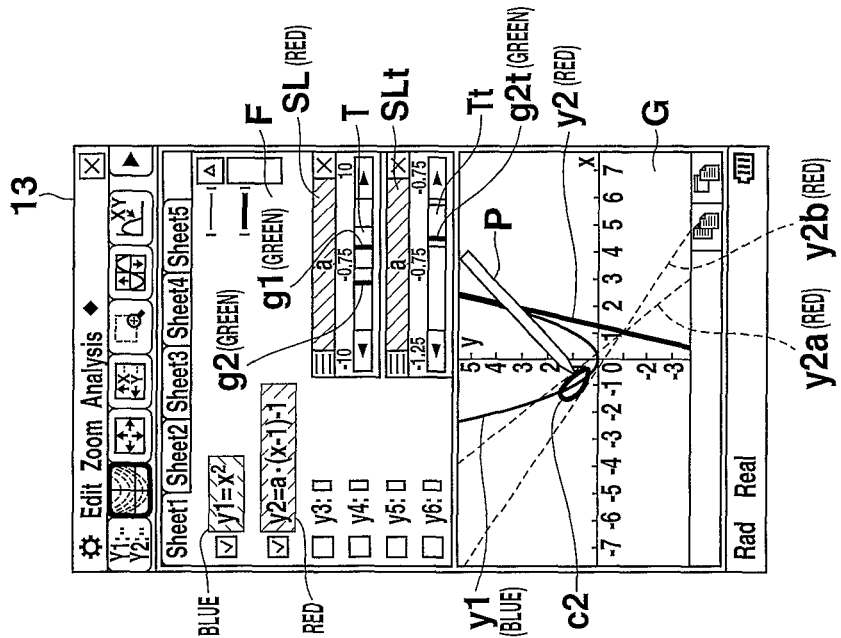

FIG. 11A and FIG. 11B are views illustrating the display operation (part 3) corresponding to the user operation according to the third embodiment, which is involved in the graph rendering process of the graph scientific electronic calculator 10.

In the third embodiment, a description is given of an operation in the case of learning by displaying graph images y1 and y2, with respect to the value of a coefficient "a" at a time when a quadratic curve corresponding to a function expression, $y1=x^2$, and a straight line, $y2=a\cdot(x-1)-1$, with an inclination "a" passing through coordinates (1, −1), come in contact.

The value of the coefficient "a" becomes a= $2-2\sqrt{2}$ (=−0.828 . . . ), and $2+2\sqrt{2}$ (=4.828 . . . ). The value of the coefficient "a" including $\sqrt{2}$ cannot correctly be set by the above-described numerical value change operation by the step unit of the coefficient slider SL or the numerical value change operation by the dot unit. Thus, as will be described below, the fine adjustment slider SLt is displayed, and characteristic position marks g1t and g2t are displayed at the position of the numerical value of the coefficient "a" at a time when the straight line y2 becomes tangent to the quadratic curve y1, so that the graph characteristic point can quickly and exactly be analyzed.

To begin with, as illustrated in FIG. 9A, if the graph mode is started (step S1 (Yes)) and, in the graph expression area F displayed on the touch panel display unit 13, the position of the expression number yn is designated by a touch operation and a function expression with a coefficient is input in accordance with an operation of the key input unit 12 (step S2), the input function expression is stored in the mathematical expression data storage area 15d and is displayed in a display color which is individually set in advance in accordance with the designated expression number yn (step S3).

In the present embodiment, a function expression, $y1=x^2$, which has been input, is displayed in blue, and also a rendering color mark m1, which indicates the rendering color of a line segment of a graph image corresponding to the function expression y1, is displayed in blue that is the same color as the display color of the function expression y1. In addition, a function expression, $y2=a\cdot(x-1)-1$, which has been input, is displayed in red, and also a rendering color mark m2, which indicates the rendering color of a line segment of a graph image corresponding to the function expression y2, is displayed in red that is the same color as the display color of the function expression y2.

In this manner, in the graph expression area F in which the function expressions y1 and y2 have been input, check boxes Bc, which are located at the beginning of the function expressions, are touched and designated, and check marks are added to the function expressions y1 and y2 which are objects of rendering of graph images (step S4).

As regards the function expressions y1 and y2 to which the check marks have been added, in order to display the variation of the graph image corresponding to the function expression y2 while varying the coefficient "a" of the function expression y2, if the execution icon Dy of the dynamic graph mode is touch-operated (step S5 (Yes)), a slider pattern of the coefficient slider SL, which is associated with the coefficient "a" of the function expression y2, is set and stored in the slider pattern table 15f (step S6).

Specifically, as initial values for varying the coefficient "a", the current value (Current) is set at "1", the minimum value (Min) is set at "−10", the maximum value (Max) is set at "10" and the variation amount (Step) is set at "1", and the display color of the coefficient slider SL is set to be red which is the same color as the display color of the function expression y2 including the coefficient "a", and the respective setting data are stored in the slider pattern table 15f.

Then, in accordance with the slider pattern of the coefficient "a" stored in the slider pattern table 15f, the coefficient slider SL, to which a bar of the set display color "red" is added, is displayed on the touch panel display unit 13 (step S7).

Then, the data of the graph image y1 corresponding to the quadratic function expression, $y1=x^2$, and the data of the graph image y2 corresponding to the linear function expression, $y2=a \cdot (x-1)-1$, in which the numerical value of the coefficient "a" is set at the above set current value "1", are rendered in the graph data storage area 15h in accordance with the XY coordinate range stored in the range data storage area 15c. In addition, the graph image y1 is displayed on the graph image area G in blue that is the same display color as the function expression, $y1=x^2$, and also the graph image y2 is displayed on the graph image area G in red that is the same display color as the function expression, $y2=a \cdot (x-1)-1$, and the coefficient slider SL thereof (step S8).

In this case, if the right button [→] Bu of the coefficient slider SL is pen-touched five times (step S9 (Yes)), the current value of the coefficient "a" is increased in units of the variation amount "1" that is the step unit, and is changed to "6", as illustrated in FIG. 9B, in accordance with the direction of the pen-touched right button Bu and the number of touches (step S11), and the graph image y2 corresponding to the function expression, $y2=a \cdot (x-1)-1$, of the changed coefficient "a" (=6) is re-rendered (step S16).

As illustrated in FIG. 9A and FIG. 9B, while the right button [←] Bu of the coefficient slider SL is repeatedly pen-touched and the current value of the coefficient "a" is increased in units of the step-unit variation amount "1", the inclination of the graph image y2 corresponding to the function expression y2 is gradually varied in the plus direction (step S9, S11, S16). In this state, as illustrated in FIG. 9B, if the current value of the coefficient "a" has increased to "6" and the graph image y2 corresponding to the function expression y2 has moved past a position at which the graph image y2 exactly becomes a tangent to the graph image y1 corresponding to the function expression y1, the left button [←] Bd of the coefficient slider SL, which is in the reverse direction, is touch-operated twice and the current value is brought back to "4".

Then, it is determined that the position of the tab T, which is moved in accordance with the current value of the coefficient slider SL, was moved in one direction and then moved in the other direction (step S17 (Yes)).

In this case, if it is determined that a predetermined time has passed since the movement of the tab T in the other direction was stopped (step S18 (Yes)), the range ("4"~"6"), within which the tab T of the coefficient slider SL was moved in one direction and then brought back in association with the coefficient value that was increased/decreased by the coefficient slider SL, is obtained as a numerical value variable range (minimum value "4", maximum value "6") of the fine adjustment slider SLt (step S19).

Then, a transition occurs to the fine adjustment slider setting process in FIG. 5 (step SA)

Then, in this fine adjustment slider setting process, based on the numerical value variable range (minimum value "4", maximum value "6") of the fine adjustment slider SLt which has been obtained in accordance with a user operation of the coefficient slider SL, a step-unit variation amount (Step: 0.2) thereof is calculated (step A1).

Then, the setting data of the fine adjustment slider SLt, in which the minimum value (Min) is set at "4", the maximum value (Max) is set at "6", the variation amount (Step) is set at "0.2" and the current value (Current) is set at "4", is generated and stored in the fine adjustment slider pattern table 15g. In addition, as illustrated in FIG. 9C, the fine adjustment slider SLt is additionally displayed such that the fine adjustment slider SLt is juxtaposed under the above-described original coefficient slider SL (step A2).

It is then determined whether there is a graph characteristic point (e.g. a point of contact with another graph image, a point of contact with a coordinate axis) in the numerical value variation range of the fine adjustment slider SLt (step A3).

In this case, if it is determined that a numerical value ($2+2\sqrt{2}$ (=4.828 . . . )) corresponding to a graph characteristic point (in this case, a point at which the graph image y2 becomes a tangent to the graph image y1) is included in the numerical value variation range (4~6) of the fine adjustment slider SLt (step A3 (Yes)), the numerical value "4.828" of the coefficient "a", which corresponds to this characteristic point (tangent), is stored in the fine adjustment slider pattern table 15g. Then, as illustrated in FIG. 9C, characteristic position marks g1 and g1t, which indicate the position of the numerical value "4.828" corresponding to the characteristic point (tangent), are distinguishably displayed in green on the coefficient slider SL and fine adjustment slider SLt (step A4).

Thus, by the repeated pen touch on the right button [→] Bu on the fine adjustment slider SLt shown in FIG. 9C (step S9 (Yes)), if the current value "4" of the coefficient "a" is increased in units of the variation amount (Step) "0.2" and changed to "5", and it is determined that the current value has reached or exceeded the coefficient value "4.828" corresponding to the characteristic position mark g1t (step S10 (Yes)), as shown in FIG. 10A, the position of the tab Tt is once stopped at the position of the characteristic position mark g1t, and the current value of the coefficient "a" is changed to the numerical value "$2+2\sqrt{2}$ (=4.828)" corresponding to the characteristic position mark g1t and is displayed (step S15).

Then, the graph image y2 of the function expression, $y2=a \cdot (x-1)-1$, in which the coefficient "a" has been changed to "$2+2\sqrt{2}$ (=4.828)", is re-rendered as the exact tangent to the graph image y1 corresponding to the function expression, $y1=x^2$ (step S16).

Thereby, when the inclination of the graph image y2 corresponding to the linear function expression y2 is varied by a user operation of the coefficient slider SL and the position, at which the graph image y2 becomes a tangent to the graph image y1 corresponding to the quadratic function expression y1, is analyzed, if the linear graph image y2, which is varied, has moved past the position, at which the linear graph image y2 becomes the tangent to the quadratic graph image y1, and has varied in the neighborhood of this position, the fine adjustment slider SLt having the numerical value variable range of the coefficient "a" between the minimum value "4" and the maximum value "6", which corresponds to the range of the neighborhood of this position, is displayed. Along with this, in the numerical value variable range of the coefficient "a" by the fine adjustment slider SLt, the characteristic position mark g1t is displayed at the characteristic point at which the linear graph image y2 becomes the tangent to the quadratic graph image y1. When the numerical value change by the fine adjustment slider SLt has reached or exceeded the characteristic point corresponding to this characteristic position mark g1t, the current value of the coefficient "a" is once changed to the numerical value of this characteristic point, and the linear graph image y2 is re-displayed. Thus, the linear graph image y2 can more exactly and easily be varied to agree with the position at which the linear graph image y2 becomes the tangent to the quadratic graph image y1.

In addition, thereafter, as illustrated in FIG. 10B, when the inclination of the graph image y2 corresponding to the linear function expression y2 is further varied and a position corresponding to another tangent (characteristic point) to the graph image y1 corresponding to the quadratic function expression y1 is to be analyzed, if it is determined that a circling operation c2 has been performed by the pen P in the vicinity of another characteristic point which is estimated on the graph image y1 (step S22 (Yes)), the current value "$2+2\sqrt{2}$ (=4.828)" of the coefficient "a" is varied and increased/decreased, and graph images y2a and y2b, which are tangent to the designated range of the circling operation c2, are rendered by broken lines in the graph data storage area 15h and are displayed on the graph image area G (step S23).

Then, a variation range ("−1.25"~"−0.75" in this case) of the coefficient "a", which is involved in the rendering of the graph images y2a and y2b of broken lines that are tangent to the designated range of the circling operation c2, is obtained as a numerical value variable range (minimum value "−1.25", maximum value "−0.75") of the fine adjustment slider SLt (step S25).

Then, a transition occurs to the fine adjustment slider setting process in FIG. 5 (step SA). Based on the obtained numerical value variable range (minimum value "−1.25", maximum value "−0.75"), a step-unit variation amount (Step: 0.05) thereof is calculated (step A1).

Then, the setting data of the fine adjustment slider SLt, in which the minimum value (Min) is set at "−1.25", the maximum value (Max) is set at "−0.75", the variation amount (Step) is set at "0.05" and the current value (Current) is set at "−0.75", is generated and stored in the fine adjustment slider pattern table 15g. In addition, as illustrated in FIG. 11A, the fine adjustment slider SLt is additionally displayed such that the fine adjustment slider SLt is juxtaposed under the above-described original coefficient slider SL (step A2).

In this case, if it is determined that a numerical value ($2-2\sqrt{2}$ (=−0.828 . . . )) corresponding to a graph characteristic point (in this case, a point at which the graph image y2 becomes a tangent to the graph image y1) is included in the numerical value variation range (−1.25~−0.75) of the fine adjustment slider SLt (step A3 (Yes)), the numerical value "−0.828" of the coefficient "a", which corresponds to this characteristic point (tangent), is stored in the fine adjustment slider pattern table 15g. Then, as illustrated in FIG. 11A, characteristic position marks g2 and g2t, which indicate the position of the numerical value "−0.828" corresponding to the characteristic point (tangent), are distinguishably displayed in green on the coefficient slider SL and fine adjustment slider SLt (step A4).

Thus, on the fine adjustment slider SLt shown in FIG. 11A, by the tab Tt being touched and moved to the left direction (step S12 (Yes)), the current value "−0.75" of the coefficient "a" is decreased in units of the variation amount (Dot) that is the dot unit. If it is determined that the current value has reached or exceeded the coefficient value "−0.828" corresponding to the characteristic position mark g2t (step S13 (Yes)), the position of the tab Tt is once stopped at the position of the characteristic position mark g2t, and the current value of the coefficient "a" is changed to the numerical value "$2-2\sqrt{2}$ (=−0.828)" corresponding to the characteristic position mark g2t and is displayed (step S15).

Then, the graph image y2 of the function expression, $y2=a\cdot(x-1)-1$, in which the coefficient "a" has been changed to "$2-2\sqrt{2}$ (=−0.828)", is re-rendered as the exact tangent to the graph image y1 corresponding to the function expression, $y1=x^2$ (step S16).

Thereby, when the inclination of the graph image y2 corresponding to the linear function expression y2 is varied by a user operation of the coefficient slider SL and the position, at which the graph image y2 becomes a tangent to the graph image y1 corresponding to the quadratic function expression y1, is analyzed, the circling operation c2 is performed around the neighborhood of the characteristic point of the graph image y2 relative to the graph image y1 displayed on the graph image area G. Also by this, the fine adjustment slider SLt of the numerical value variable range, which corresponds to the variation range of the graph images y2a and y2b corresponding to the circling operation c2, can be generated and displayed. Along with this, in the numerical value variable range of the coefficient "a" by the fine adjustment slider SLt, the characteristic position mark g2t is displayed at the characteristic point at which the linear graph image y2 becomes the tangent to the quadratic graph image y1. When the numerical value change by the fine adjustment slider SLt has reached or exceeded the characteristic point corresponding to this characteristic position mark g2t, the current value of the coefficient "a" is once changed to the numerical value of this characteristic point, and the linear graph image y2 is re-displayed. Thus, the linear graph image y2 can more exactly and easily be varied to agree with the position at which the linear graph image y2 becomes the tangent to the quadratic graph image y1.

Thus, according to the graph rendering function of the graph scientific electronic calculator 10 with the above-described structure, the graph images y1 and y2 corresponding to the quadratic function expression, $y1=x^2$, and linear function expression, $y2=a\cdot(x-1)-1$, which are designated as objects of rendering, are displayed. In addition, the numerical value of the coefficient "a" included in the linear function expression y2 is varied by the coefficient slider SL and the inclination of the corresponding graph image y2 is varied, and the position (characteristic point) at which the graph image y2 becomes the tangent to the graph image y1 is analyzed. At this time, for example, when the numerical value of the coefficient "a", which is varied by the coefficient slider SL, was once changed past the numerical value corresponding to the characteristic point and was then brought back, the fine adjustment slider SLt, which is limited to the numerical value range (minimum value~maximum value) in the neighborhood of the characteristic point, is additionally displayed, and the numerical value of the coefficient "a" can be finely adjusted and varied in the neighborhood of the characteristic point.

Thus, by the user operation, the linear graph image y2 can easily and exactly be varied to the position (characteristic point), at which the linear graph image y2 becomes the tangent to the quadratic graph image y1, and can be displayed.

In addition, according to the graph rendering function of the graph scientific electronic calculator 10 with the above-described structure, also when the circling operation c1 is performed around the position of the tab T which is moved and operated within the numerical value variable range of the coefficient slider SL, the fine adjustment slider SLt, which is limited to the numerical value range (minimum value~maximum value) designated by the circling operation c1, is additionally displayed, and the numerical value of the coefficient "a" can be finely adjusted and varied.

Furthermore, according to the graph rendering function of the graph scientific electronic calculator 10 with the above-described structure, also when the touch operation is performed at the position of the tab T which is moved and operated within the numerical value variable range of the coefficient slider SL, the fine adjustment slider SLt, which is limited to the numerical value range (minimum value~maximum value) designated by the circle Q1 that is displayed with a size corresponding to the touch time or strength (pressure) of the touch operation, is additionally displayed, and the numerical value of the coefficient "a" can be finely adjusted and varied.

In addition, according to the graph rendering function of the graph scientific electronic calculator 10 with the above-described structure, when the circling operation c2 is performed at a desired position on the graph image y2 which is varied by the numerical value operation of the coefficient "a" by the coefficient slider SL, the numerical value of the coefficient "a" is varied and the graph images y2a and y2b of broken lines, which are tangent to the range designated by the circling operation c2, are displayed. Further, the fine adjustment slider SLt, which is limited to the numerical value range (minimum value~maximum value) of the coefficient "a" corresponding to each graph image y2a, y2b, is additionally displayed, and the numerical value of the coefficient "a" can be finely adjusted and varied.

Besides, according to the graph rendering function of the graph scientific electronic calculator 10 with the above-described structure, also when the touch operation is performed for a predetermined time at a desired position on the graph image y2 which is varied by the numerical value operation of the coefficient "a" by the coefficient slider SL, the graph images y2a and y2b of broken lines, which are tangent to the range designated by the circle Q2 that is displayed with a size corresponding to the touch time or strength (pressure) of the touch operation, are displayed. Further, the fine adjustment slider SLt, which is limited to the numerical value range (minimum value~maximum value) of the coefficient "a" corresponding to each graph image y2a, y2b, is additionally displayed, and the numerical value of the coefficient "a" can be finely adjusted and varied.

Moreover, according to the graph rendering function of the graph scientific electronic calculator 10 with the above-described structure, if a position of the numerical value, which corresponds to the characteristic point, exists in the numeral value variable range of the coefficient "a" of the fine adjustment slider SLt, the position of the numerical value, which corresponds to the characteristic point, is distinguishably displayed as the characteristic position mark gt.

Thus, needless to say, the numerical value of the coefficient "a" can easily be made to agree with the numerical value corresponding to the characteristic point, by moving and operating the tab Tt of the fine adjustment slider SLt. In addition, when the numerical value of the coefficient "a" is varied by the left button [←] Bd, the right button [→] Bu, or the tab Tt, if the numerical value, which is being varied, has reached or exceeded the position of the numerical value corresponding to the characteristic point, the numerical value, which is being varied, is once stopped at the position of the numerical value corresponding to the characteristic point, and the graph image y2 is re-rendered in the state which the graph image y2 includes the characteristic point. Therefore, the linear graph image y2 can more exactly and easily be varied to agree with the position (characteristic point) at which the linear graph image y2 becomes the tangent to the quadratic graph image y1.

In the meantime, in each of the above-described embodiments, the description has been given of the graph rendering function in which when a graph image corresponding to a function expression, which is arbitrarily designated by a user, is to be displayed, the numerical value of a coefficient included in this function expression is varied by the coefficient slider SL and the fine adjustment slider SLt thereof, and the corresponding graph image is varied and displayed. However, the embodiments are not limited to this example.

Such a configuration may be adopted that when a graphic image, which is arbitrarily designated by a user, is to be displayed by a graphic rendering function, a slider SL and a fine adjustment slider SLt thereof, by which the length of a side and the magnitude of an angle that alter the graphic image can be varied in accordance with a user operation, are displayed in the same manner as described above, and the length of the side and the magnitude of the angle of the graphic image are quickly and easily changed to specific values, thereby displaying the graphic image.

In addition, in each of the above-described embodiments, it has been assumed that the various operations of the graph rendering function and the graphic rendering function are executed by the user operation on the touch panel display unit 13. However, such a configuration may be adopted that the same various operations are executed by a user operation of a pointer which can be moved and operated on the display screen.

Besides, in each of the above-described embodiments, the description has been given of the configuration in which the slider SL and the fine adjustment slider SLt thereof, each having a scroll-bar-shaped numerical value variable range, are disposed in juxtaposition as operation display elements for varying, in accordance with the user operation, the parameters for varying and displaying graph images or graphic images. However, the embodiments are not limited to this configuration. For example, such a configuration may be adopted that a circular slider and a fine adjustment slider thereof, each having a numerical value variable range in the circumferential direction, are displayed.

Incidentally, the methods of the respective processes by the graph display control apparatus described in each of the embodiments, that is, the respective methods of the graph rendering process illustrated in FIG. 3 and FIG. 4 and the fine adjustment slider setting process involved in the graph rendering process illustrated in the flowchart of FIG. 5, can all be stored as computer-executable programs in a medium of an external storage device, such as a memory card (ROM card, RAM card, etc.), a magnetic disk (floppy disk, hard disk, etc.), an optical disc (CD-ROM, DVD, etc.), or a semiconductor memory, and can be distributed. In addition, the computer (control apparatus) of the electronic device including a user input-capable display unit reads the program, which is stored in the medium of the external storage device, into the storage device, and the operation is controlled by this read-in program. Thereby, it is possible to realize the graph rendering function, which has been described in each of the embodiments, and to execute the same processes by the above-described methods.

In addition, the data of the program for realizing each of the above-described methods can be transmitted on a communication network in the form of a program code, and the data of the program can be taken in the electronic device including the user input-capable display unit from a computer apparatus (program server) connected to this communication network, and stored in the storage device, thereby realizing the above-described graph rendering function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
   a display; and
   a processor which is configured to:
   display a function expression including a coefficient on the display;
   display a main graph image which represents the function expression on the display;
   obtain a second variation range determined by a second minimum value and a second maximum value included in a first variation range determined by a preset first minimum value and a preset first maximum value in accordance with a user operation;
   display on the display an operation display element for varying a value of the coefficient;
   vary the value of the coefficient within the second variation range in accordance with a user operation of the operation display element; and
   change the main graph image displayed on the display to a changed main graph image which represents a changed function expression obtained by substituting the value of the coefficient varied in accordance with the user operation of the operation display element into the function expression, and display the changed main graph image,
   wherein obtaining the second variation range in accordance with the user operation comprises:
   displaying an image indicating a variation range of the main graph image in accordance with the user operation; and
   obtaining the second minimum value for displaying a first graph image that is tangent to the image indicating the variation range of the main graph image and the second maximum value for displaying a second graph image that is tangent to the image indicating the variation range of the main graph image, as the second variation range, and
   wherein the processor is further configured to display the first graph image that is tangent to the image indicating the variation range of the main graph image and the second graph image that is tangent to the image indicating the variation range of the main graph image.

2. The electronic device of claim 1, wherein the processor is further configured to:
   display on the display a first range operation display element for varying the value of the coefficient within the first variation range; and
   vary the value of the coefficient within the first variation range in accordance with a user operation of the first range operation display element,
   wherein obtaining the second variation range in accordance with the user operation comprises:
   obtaining, when the value of the coefficient varied in accordance with the user operation of the first range operation display element was increased or decreased in one direction and was then decreased or increased in the other direction, a range of the increase/decrease as the second variation range.

3. The electronic device of claim 1, wherein displaying the image indicating the variation range of the main graph image comprises displaying a range on the main graph image displayed on the display, which is circled in accordance with a user operation, as an image indicating the second variation range.

4. The electronic device of claim 1, wherein displaying the image indicating the variation range of the main graph image comprises:
   displaying a circle of a size corresponding to a touch time or touch strength of a touch operation of a user for any one of positions of the main graph image displayed on the display around the position as the image indicating the second variation range.

5. The electronic device of claim 1, wherein varying the value of the coefficient within the second variation range in accordance with the user operation comprises:
   varying, when a value of the coefficient, at which the main graph image displayed becomes a characteristic point, is included in the second variation range of the value of the coefficient which is variable by the operation display element, the current value of the coefficient to the value of the coefficient, at which the main graph image becomes the characteristic point, in accordance with a user operation of the operation display element.

6. The electronic device of claim 1, wherein the processor is further configured to:
   display, when a value of the coefficient, at which the main graph image displayed becomes a characteristic point, is included in the second variation range of the value of the coefficient which is variable by the operation display element, a mark at a position of the value of the coefficient of the operation display element, at which the main graph image becomes the characteristic point.

7. A method for displaying a graph image by controlling a computer of an electronic device including a display, the method comprising controlling the computer to execute functions comprising:
   displaying a function expression including a coefficient on the display;
   displaying a main graph image which represents the function expression on the display;
   obtaining a second variation range determined by a second minimum value and a second maximum value included in a first variation range determined by a preset first minimum value and a preset first maximum value in accordance with a user operation;
   displaying on the display an operation display element for varying a value of the coefficient;
   varying the value of the coefficient within the second variation range in accordance with a user operation of the operation display element; and
   changing the main graph image displayed on the display to a changed main graph image which represents a changed function expression obtained by substituting the value of the coefficient varied in accordance with the user operation of the operation display element into the function expression and displaying the changed main graph image,
   wherein obtaining the second variation range in accordance with the user operation comprises:
   displaying an image indicating a variation range of the main graph image in accordance with the user operation; and
   obtaining the second minimum value for displaying a first graph image that is tangent to the image indicating the variation range of the main graph image and the second maximum value for displaying a second graph image that is tangent to the image indicating the variation range of the main graph image, as the second variation range, and
   wherein the method further comprises controlling the computer to execute functions comprising:
   displaying the first graph image that is tangent to the image indicating the variation range of the main graph image and the second graph image that is tangent to the image indicating the variation range of the main graph image.

8. The method of claim 7, further comprising controlling the computer to execute functions comprising:
displaying on the display a first range operation display element for varying the value of the coefficient within the first variation range; and
varying the value of the coefficient within the first variation range in accordance with a user operation of the first range operation display element,
wherein obtaining the second variation range in accordance with the user operation comprises:
obtaining, when the value of the coefficient varied in accordance with the user operation of the first range operation display element was increased or decreased in one direction and was then decreased or increased in the other direction, a range of the increase/decrease as the second variation range.

9. The method of claim 7, wherein displaying the image indicating the variation range of the main graph image comprises displaying a range on the main graph image displayed on the display, which is circled in accordance with a user operation, as an image indicating the second variation range.

10. The method of claim 7, wherein displaying the image indicating the variation range of the main graph image comprises:
displaying a circle of a size corresponding to a touch time or touch strength of a touch operation of a user for any one of positions of the main graph image displayed on the display around the position as the image indicating the second variation range.

11. The method of claim 7, wherein varying the value of the coefficient within the second variation range in accordance with the user operation comprises:
varying, when a value of the coefficient, at which the main graph image displayed becomes a characteristic point, is included in the second variation range of the value of the coefficient which is variable by the operation display element, the current value of the coefficient to the value of the coefficient, at which the main graph image becomes the characteristic point, in accordance with a user operation of the operation display element.

12. The method of claim 7, further comprising controlling the computer to execute functions comprising:
displaying, when a value of the coefficient, at which the main graph image displayed becomes a characteristic point, is included in the second variation range of the value of the coefficient which is variable by the operation display element, a mark at a position of the value of the coefficient of the operation display element, at which the main graph image becomes the characteristic point.

13. A non-transitory computer-readable storage medium having stored thereon a program for controlling a computer of an electronic device including a display, the program controlling the computer to execute functions comprising:
displaying a function expression including a coefficient on the display;
displaying a main graph image which represents the function expression on the display;
obtaining a second variation range determined by a second minimum value and a second maximum value included in a first variation range determined by a preset first minimum value and a preset first maximum value in accordance with a user operation;
displaying on the display an operation display element for varying a value of the coefficient;
varying the value of the coefficient within the second variation range in accordance with a user operation of the operation display element; and
changing the main graph image displayed on the display to a changed main graph image which represents a changed function expression obtained by substituting the value of the coefficient varied in accordance with the user operation of the operation display element into the function expression and displaying the changed main graph image,
wherein obtaining the second variation range in accordance with the user operation comprises:
displaying an image indicating a variation range of the main graph image in accordance with the user operation; and
obtaining the second minimum value for displaying a first graph image that is tangent to the image indicating the variation range of the main graph image and the second maximum value for displaying a second graph image that is tangent to the image indicating the variation range of the main graph image, as the second variation range, and
wherein the program further controls the computer to execute functions comprising:
displaying the first graph image that is tangent to the image indicating the variation range of the main graph image and the second graph image that is tangent to the image indicating the variation range of the main graph image.

14. The non-transitory computer-readable medium of claim 13, wherein the program further controls the computer to execute functions comprising:
displaying on the display a first range operation display element for varying the value of the coefficient within the first variation range; and
varying the value of the coefficient within the first variation range in accordance with a user operation of the first range operation display element,
wherein obtaining the second variation range in accordance with the user operation comprises:
obtaining, when the value of the coefficient varied in accordance with the user operation of the first range operation display element was increased or decreased in one direction and was then decreased or increased in the other direction, a range of the increase/decrease as the second variation range.

15. The non-transitory computer-readable medium of claim 13, wherein displaying the image indicating the variation range of the main graph image comprises displaying a range on the main graph image displayed on the display, which is circled in accordance with a user operation, as an image indicating the second variation range.

16. The non-transitory computer-readable medium of claim 13, wherein displaying the image indicating the variation range of the main graph image comprises:
displaying a circle of a size corresponding to a touch time or touch strength of a touch operation of a user for any one of positions of the main graph image displayed on the display around the position as the image indicating the second variation range.

17. The non-transitory computer-readable medium of claim 13, wherein varying the value of the coefficient within the second variation range in accordance with the user operation comprises:

varying, when a value of the coefficient, at which the main graph image displayed becomes a characteristic point, is included in the second variation range of the value of the coefficient which is variable by the operation display element, the current value of the coefficient to the value of the coefficient, at which the main graph image becomes the characteristic point, in accordance with a user operation of the operation display element.

18. The non-transitory computer-readable medium of claim 13, wherein the program further controls the computer to execute functions comprising:

displaying, when a value of the coefficient, at which the main graph image displayed becomes a characteristic point, is included in the second variation range of the value of the coefficient which is variable by the operation display element, a mark at a position of the value of the coefficient of the operation display element, at which the main graph image becomes the characteristic point.

* * * * *